US012752518B2

(12) United States Patent
Wakaki

(10) Patent No.: US 12,752,518 B2
(45) Date of Patent: Oct. 6, 2026

(54) WAVELENGTH CONVERSION MEMBER

(71) Applicant: NICHIA CORPORATION, Anan (JP)

(72) Inventor: Takayoshi Wakaki, Anan (JP)

(73) Assignee: NICHIA CORPORATION, Anan (JP)

( * ) Notice: Subject to any disclaimer, the term of this patent is extended or adjusted under 35 U.S.C. 154(b) by 275 days.

(21) Appl. No.: 18/652,485

(22) Filed: May 1, 2024

(65) Prior Publication Data

US 2024/0375380 A1 Nov. 14, 2024

(30) Foreign Application Priority Data

May 12, 2023 (JP) ................................ 2023-079415

(51) Int. Cl.

| | |
|---|---|
| ***B32B 23/08*** | (2006.01) |
| ***B32B 23/04*** | (2006.01) |
| ***B32B 23/20*** | (2006.01) |
| ***B32B 27/08*** | (2006.01) |
| ***B32B 27/36*** | (2006.01) |
| ***B82Y 20/00*** | (2011.01) |
| *G02F 1/13357* | (2006.01) |

(52) U.S. Cl.

CPC ............. *B32B 23/08* (2013.01); *B32B 23/04* (2013.01); *B32B 23/20* (2013.01); *B32B 27/08* (2013.01); *B32B 27/36* (2013.01); *B32B 2255/10* (2013.01); *B32B 2255/205* (2013.01); *B32B 2255/26* (2013.01); *B32B 2307/7242* (2013.01); *B32B 2551/00* (2013.01); *B82Y 20/00* (2013.01); *G02F 1/133617* (2013.01)

(58) Field of Classification Search

CPC ......... B32B 23/04; B32B 23/08; B32B 23/20; B32B 27/08; B32B 27/36; B32B 2255/10; B32B 2255/205; B32B 2255/26; B32B 2307/7242; B32B 2251/00; B82Y 20/00; G02F 1/133617

See application file for complete search history.

(56) References Cited

U.S. PATENT DOCUMENTS

| | | | |
|---|---|---|---|
| 2011/0037926 | A1 | 2/2011 | Tsukahara et al. |
| 2012/0202030 | A1 | 8/2012 | Kondo et al. |

(Continued)

FOREIGN PATENT DOCUMENTS

| | | | |
|---|---|---|---|
| EP | 4 306 611 | A1 | 1/2024 |
| JP | 2009-283441 | A | 12/2009 |

(Continued)

*Primary Examiner* — Maria V Ewald
*Assistant Examiner* — Ethan Weydemeyer
(74) *Attorney, Agent, or Firm* — Foley & Lardner LLP

(57) ABSTRACT

The wavelength conversion member includes: a wavelength conversion layer having a first main surface, a second main surface on a side opposite the first main surface, and lateral surfaces connecting the first main surface and the second main surface, the wavelength conversion layer containing quantum dots; a first barrier layer disposed on the first main surface; a second barrier layer disposed on the second main surface; an inorganic member disposed between the first barrier layer and the second barrier layer and surrounding the lateral surfaces of the wavelength conversion layer in a plan view; a first resin layer disposed between the first barrier layer and the inorganic member and connecting the first barrier layer and the inorganic member; and a second resin layer disposed between the second barrier layer and the inorganic member and connecting the second barrier layer and the inorganic member.

17 Claims, 7 Drawing Sheets

(56) References Cited

U.S. PATENT DOCUMENTS

| | | | |
|---|---|---|---|
| 2018/0123085 A1 | 5/2018 | Kakishita et al. |
| 2018/0138027 A1 | 5/2018 | Oku et al. |
| 2018/0163318 A1 | 6/2018 | Kamo et al. |
| 2019/0044035 A1 | 2/2019 | Nishimiya et al. |
| 2021/0363422 A1 | 11/2021 | Nikata et al. |
| 2022/0089452 A1 | 3/2022 | Torimoto et al. |

FOREIGN PATENT DOCUMENTS

| | | | |
|---|---|---|---|
| JP | 2016-004954 A | 1/2016 |
| JP | 2017-161818 A | 9/2017 |
| JP | 2017-186179 A | 10/2017 |
| JP | 2017-224780 A | 12/2017 |
| JP | 2018-004975 A | 1/2018 |
| JP | 2018-018871 A | 2/2018 |
| JP | 2018-044142 A | 3/2018 |
| WO | WO-2011/048978 A1 | 4/2011 |
| WO | WO-2016/039079 A1 | 3/2016 |
| WO | WO-2017/002783 A1 | 1/2017 |
| WO | WO-2017/026118 A1 | 2/2017 |
| WO | WO-2017/026349 A1 | 2/2017 |
| WO | WO-2020/162622 A1 | 8/2020 |
| WO | WO-2021/039290 A1 | 3/2021 |
| WO | WO-2022/191032 A1 | 9/2022 |
| WO | WO-2023/013361 A1 | 2/2023 |

WAVELENGTH CONVERSION MEMBER

CROSS-REFERENCE TO RELATED APPLICATIONS

The present application claims priority under 35 U.S.C. § 119 to Japanese Patent Application No. 2023-079415, filed May 12, 2023, the contents of which is hereby incorporated by reference in its entirety.

BACKGROUND

1. Technical Field

The present disclosure relates to a wavelength conversion member.

2. Description of Related Art

In the field of image display devices such as liquid crystal display devices, it has been proposed to use a wavelength conversion member containing quantum dots to improve color reproducibility. In such a device, when the quantum dots are exposed to moisture, oxygen, or the like, the wavelength conversion efficiency of the wavelength conversion member may degrade. For example, in PCT Publication No. WO 2016/039079, a functional laminated film is proposed including a functional layer laminate including a functional layer containing quantum dots and two gas barrier films, and an end-surface protective layer covering an end surface of the functional layer laminate.

SUMMARY

There is still room for improvement in reducing wavelength conversion efficiency degradation of the wavelength conversion member.

An object of one aspect of the present disclosure is to provide a wavelength conversion member in which degradation in wavelength conversion efficiency can be reduced.

A wavelength conversion member according to an embodiment of the present disclosure includes: a wavelength conversion layer having a first main surface, a second main surface on a side opposite the first main surface, and lateral surfaces connecting the first main surface and the second main surface, the wavelength conversion layer containing quantum dots; a first barrier layer disposed on the first main surface; a second barrier layer disposed on the second main surface; an inorganic member disposed between the first barrier layer and the second barrier layer and surrounding the lateral surfaces of the wavelength conversion layer in a plan view; a first resin layer disposed between the first barrier layer and the inorganic member and connecting the first barrier layer and the inorganic member; and a second resin layer disposed between the second barrier layer and the inorganic member and connecting the second barrier layer and the inorganic member.

According to one aspect of the present disclosure, a wavelength conversion member can be provided in which degradation in wavelength conversion efficiency can be reduced.

BRIEF DESCRIPTION OF THE DRAWINGS

A more complete appreciation of embodiments of the invention and many of the attendant advantages thereof will be readily obtained by reference to the following detailed description when considered in connection with the accompanying drawings.

DETAILED DESCRIPTION

Figure 1A:
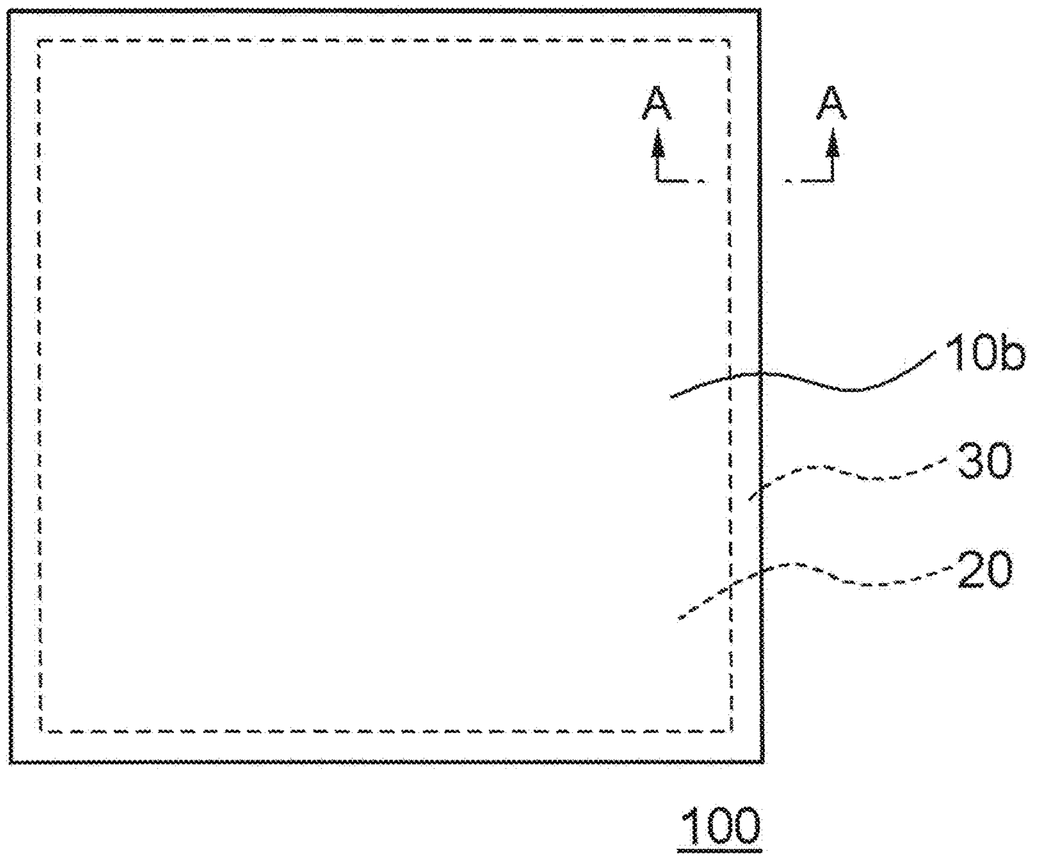
FIG. 1A is a partially transparent schematic plan view of a wavelength conversion member according to a first embodiment as viewed from a second barrier layer side.

Embodiments for implementing the invention according to the present disclosure will be described below with reference to the accompanying drawings. A wavelength conversion member according to the present disclosure described below is intended to embody technical concepts of the invention according to the present disclosure, but the invention according to the present disclosure is not limited to the following description unless otherwise specifically stated. In each drawing, members having identical functions may be denoted by the same reference characters. For ease of explanation or understanding of the points of view, the exemplary embodiments and examples may be illustrated separately for convenience, but partial substitutions or combinations of the constituent components illustrated in different embodiments and examples are possible. In the embodiments and examples described below, descriptions of matters common to those already described will be omitted, and only different features will be described. In particular, similar effects of similar configurations shall not be mentioned each time for individual embodiments. The size, positional relationship, and the like of the members illustrated in the drawings may be exaggerated in order to clarify explanation. As a cross-sectional view, an end view illustrating only a cut surface may be illustrated.

The word "step" herein includes not only an independent step, but also a step that cannot be clearly distinguished from another step as long as the anticipated purpose of the step is achieved. If a plurality of substances applicable to a single component in a composition is present, the content of the single component in the composition means the total amount of the plurality of substances present in the composition, unless otherwise specified. Furthermore, with respect to an upper limit and a lower limit of numerical ranges described herein, the numerical values exemplified as the numerical range can be freely selected and combined. Note that herein, relationships such as the relationship between a color name and a chromaticity coordinate, the relationship between a wavelength range of light and a color name of monochromatic light are in accordance with JIS Z8110. The half-value width of a phosphor means a wavelength width (full width at half maximum: FWHM) of an emission spectrum at which the emission intensity becomes 50% of the maximum emission intensity in the emission spectrum of a light-emitting material. The term "layer" used herein includes not only a case in which the layer is formed in the entire region when the region where the layer is present is observed, but also a case in which the layer is formed only in a part of the region. The term "lamination" used herein refers to stacking layers, and two or more layers may be bonded, or two or more layers may be separable. The term "lamination" may also mean that two or more layers are in contact with each other, or two or more layers are not in contact with each other but are disposed with another member interposed therebetween. In the present specification, a layer, a film, a region, a plate, or the like being disposed "on" another part includes a case in which the layer, the film, the region, the plate, or the like is disposed not only on an upper part but also on a lower part.

First Embodiment

Figure 1B:
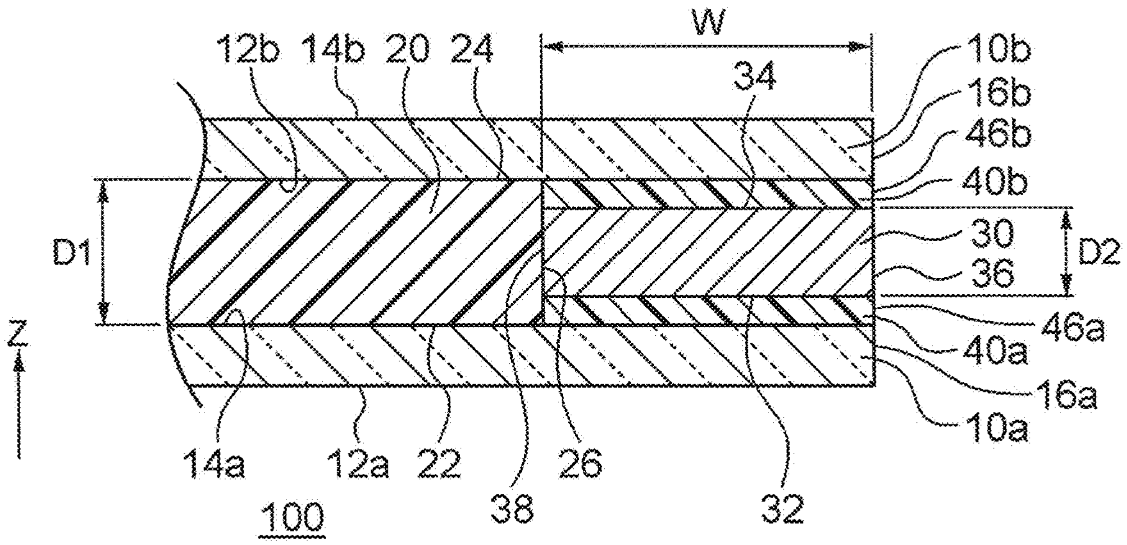
FIG. 1B is a schematic sectional view of the wavelength conversion member taken along the line A-A illustrated in FIG. 1A.

FIG. 1A is a partially transparent schematic plan view of a wavelength conversion member 100 according to a first embodiment as viewed from a second barrier layer 10*b* side. FIG. 1B is a schematic sectional view of the wavelength conversion member taken along the line A-A illustrated in FIG. 1A. The wavelength conversion member 100 has, for example, a substantially rectangular shape in a plan view. The wavelength conversion member 100 has, for example, a thin plate shape. As illustrated in FIG. 1A, an inorganic member 30 surrounds a wavelength conversion layer 20, and as illustrated in FIG. 1B, the inorganic member is disposed between a first barrier layer 10*a* and the second barrier layer 10*b*. The inorganic member 30 is located close to the wavelength conversion layer 20 along the outer periphery of the wavelength conversion member 100 and the outer periphery of the wavelength conversion layer 20. The inorganic member 30 may be in contact with the wavelength conversion layer 20, or may be disposed with a gap at least partially between the wavelength conversion layer 20 and the inorganic member 30. Although the inorganic member 30 is disposed over the entire outer periphery of the wavelength conversion layer 20 in FIG. 1A, the inorganic member 30 may be disposed only on a part of the outer periphery of the wavelength conversion layer 20.

As illustrated in FIG. 1B, the wavelength conversion member 100 includes the first barrier layer 10*a*, the wavelength conversion layer 20, and the second barrier layer 10*b*. The wavelength conversion layer 20 is disposed on the first barrier layer 10*a*. The second barrier layer 10*b* is disposed on the wavelength conversion layer 20. The wavelength conversion layer 20 has a first main surface 22, a second main surface 24 on a side opposite the first main surface 22, and lateral surfaces 26 connecting the first main surface 22 and the second main surface 24. The first barrier layer 10*a* is disposed on the first main surface 22 of the wavelength conversion layer 20, and the second barrier layer 10*b* is disposed on the second main surface 24 of the wavelength conversion layer 20. The inorganic member 30 is disposed between the first barrier layer 10*a* and the second barrier layer 10*b*. The inorganic member 30 surrounds the wavelength conversion layer 20 in a plan view and is located close to the lateral surfaces 26. The inorganic member 30 may be in contact with the lateral surfaces 26, or may be disposed with a gap at least partially between the lateral surfaces 26 and the inorganic member 30. A first resin layer 40*a* is disposed between the first barrier layer 10*a* and the inorganic member 30. The first resin layer 40*a* connects the first barrier layer 10*a* and the inorganic member 30. A second resin layer 40*b* is disposed between the second barrier layer 10*b* and the inorganic member 30. The second resin layer 40*b* connects the second barrier layer 10*b* and the inorganic member 30.

In the present specification, in the wavelength conversion member 100, a first barrier layer 10*a* side may be referred to as "below," "lower side," "lower surface side," or the like, and the side opposite to the first barrier layer 10*a* in a thickness direction Z may be referred to as "above," "upper side," "upper surface side," or the like. A direction intersecting the thickness direction Z may be referred to as "lateral side" or "lateral direction." The wavelength conversion member 100 is used in, for example, a backlight unit of a liquid crystal display device. In this case, for example, the wavelength conversion member 100 is disposed on a plurality of light-emitting elements and collectively covers the plurality of light-emitting elements. The light emitted from the plurality of light-emitting elements enters the wavelength conversion member 100 through the lower surface (for example, the first barrier layer 10*a* side) of the wavelength conversion member 100. A part of the incident light is subjected to wavelength conversion and is emitted from the upper surface (for example, the second barrier layer 10*b* side) of the wavelength conversion member 100 together with the incident light that is not subjected to wavelength conversion. Hereinafter, the configuration of the wavelength conversion member 100 will be described in detail.

First Barrier Layer

The first barrier layer 10*a* is, for example, a layer having a barrier function against moisture, oxygen, and the like. The first barrier layer 10*a* is, for example, a barrier film including an inorganic layer. The first barrier layer 10*a* includes, for example, a substrate film that is a film-like resin cured product and an inorganic layer provided on at least one main surface of the substrate film. With the first barrier layer 10 having a barrier function, moisture, oxygen, or the like entering from the first barrier layer 10*a* side can be inhibited from reaching the wavelength conversion layer 20, which allows for reducing degradation in light emission efficiency of the quantum dots contained in the wavelength conversion layer 20.

As illustrated in FIG. 1B, the first barrier layer 10*a* has a fourth main surface 14*a*, facing the first main surface 22 of the wavelength conversion layer 20, and a third main surface 12*a* on a side opposite the fourth main surface 14*a*. In this specification, the expression that two surfaces "face each other" includes a state in which the two surfaces are in contact with each other and a state in which the two surfaces are not in contact with each other but are disposed with another member disposed therebetween. The third main surface 12*a* and the fourth main surface 14*a* are positioned opposite to each other in the thickness direction Z. The third main surface 12*a* and the fourth main surface 14*a* are, for example, substantially flat surfaces orthogonal to the thickness direction Z. In the present specification, the expression that a surface of a layer is substantially flat encompasses a case in which the surface of the layer is a flat surface including irregularities generated in a process of manufacturing such as laminating. Examples of the irregularities include a height difference of 20 μm or less. The first barrier layer 10*a* has first end surfaces 16*a* connecting the third main surface 12*a* and the fourth main surface 14*a*. Each first end surface 16*a* is, for example, a flat surface extending in the thickness direction Z. The first end surfaces 16*a* are located along the outer periphery of the wavelength conversion member 100 in a plan view. Each first end surface 16*a* is coplanar with a corresponding one of third end surfaces 36 of the inorganic member 30, a corresponding one of second end surfaces 16*b* of the second barrier layer 10*b*, a corresponding one of fourth end surfaces 46*a* of the first resin layer 40*a*, and a corresponding one of fifth end surfaces 46*b* of the second resin layer 40*b*, which are to be described later.

The average thickness of the first barrier layer 10*a* is, for example, in a range from 5% to 60%, and preferably in a range from 20% to 45% of the average thickness of the wavelength conversion member 100. The average thickness of the first barrier layer 10*a* may be, for example, in a range from 20 μm to 150 μm, and preferably in a range from 20 μm to 120 μm, or in a range from 25 μm to 100 μm. The average thickness of the first barrier layer 10*a* can also be regarded as an average distance between the third main surface 12*a* and the fourth main surface 14*a*. When the first barrier layer 10*a* has a film shape, the average thickness is determined, for example, by calculating an arithmetic average value of thicknesses at any three locations measured using a reflection spectrophotometer or the like.

Wavelength Conversion Layer

The wavelength conversion layer 20 converts a wavelength of a part of the light that has entered the wavelength conversion member 100. The wavelength conversion layer 20 contains quantum dots. The wavelength conversion layer 20 is, for example, a film-like resin cured product containing quantum dots. The quantum dots will be described in detail later.

As illustrated in FIG. 1B, the wavelength conversion layer 20 has the first main surface 22 and the second main surface 24 on a side opposite the first main surface 22. The first main surface 22 and the second main surface 24 are positioned opposite to each other in the thickness direction Z. The first main surface 22 and the second main surface 24 are, for example, substantially flat surfaces orthogonal to the thickness direction Z. The wavelength conversion layer 20 is disposed on the first barrier layer 10 such that the first main surface 22 thereof and the fourth main surface of the first barrier layer 10*a* face each other.

An average thickness D1 of the wavelength conversion layer 20 is, for example, in a range from 20% to 1500%, and preferably in a range from 100% to 400% with respect to the average thickness of the first barrier layer 10*a*. The average thickness D1 of the wavelength conversion layer 20 may be, for example, in a range from 30 μm to 200 μm, and preferably in a range from 30 μm to 150 μm, or in a range from 80 μm to 120 μm. The average thickness D1 of the wavelength conversion layer 20 can also be regarded as an average distance between the first main surface 22 and the second main surface 24. When the wavelength conversion layer 20 has a film shape, the average thickness is determined in the same manner as that of the first barrier layer 10*a* having a film shape.

The wavelength conversion layer 20 has the lateral surfaces 26 that connect the first main surface 22 and the second main surface 24. The lateral surfaces 26 may be surfaces extending in the thickness direction Z. The lateral surfaces 26 are positioned inward of end surfaces of the wavelength conversion member 100. Being positioned inward of end surfaces of the wavelength conversion member 100 means, in a cross section taken along the line A-A of FIG. 1, being positioned at an inner side of the wavelength conversion member 100 relative to end surfaces of the wavelength conversion member 100 in a direction orthogonal to the thickness direction Z.

The lateral surfaces 26 of the wavelength conversion layer 20 are located along the outer periphery of the wavelength conversion member 100. The lateral surfaces 26 are, for example, annularly disposed along the outer periphery of the wavelength conversion member 100. In the cross-section taken along the line A-A, a distance W between a lateral surface 26 and an end surface of the wavelength conversion member 100 in a plan view is, for example, in a range from 100 μm to 1000 μm, and preferably in a range from 100 μm to 500 μm.

The wavelength conversion layer 20 may be formed of one layer or two or more layers. When the wavelength conversion layer 20 is formed of a plurality of layers, the quantum dots included in the plurality of layers may have different emission peak wavelengths. The wavelength conversion layer 20 includes a layer containing at least quantum dots, and may further include, for example, a layer containing a phosphor other than the quantum dots. Each layer of the wavelength conversion layer 20 may contain one type of quantum dot, may contain two or more types of quantum dots, or may contain one or more types of quantum dots and one or more types of phosphors.

Second Barrier Layer

The second barrier layer 10*b* is a layer having a barrier function against moisture, oxygen, and the like, for example, as the first barrier layer 10*a*. As the second barrier layer 10*b*, for example, a barrier film or the like including an inorganic layer may be used. With the second barrier layer 10*b* having a barrier function, moisture, oxygen, and the like entering from the second barrier layer 10*b* side can be inhibited from reaching the wavelength conversion layer 20, and degradation in light emission efficiency of the quantum dots contained in the wavelength conversion layer 20 can be reduced. The second barrier layer 10*b* may be formed of, for example, the same material as that is used for the substrate film, the inorganic layer, or the like that form the first barrier layer 10*a*.

As illustrated in FIG. 1B, the second barrier layer 10*b* has a fifth main surface 12*b* facing the second main surface 24 of the wavelength conversion layer 20, and a sixth main surface 14*b* on a side opposite the fifth main surface 12*b*.

The fifth main surface 12*b* and the sixth main surface 14*b* are positioned opposite to each other in the thickness direction Z. The fifth main surface 12*b* and the sixth main surface 14*b* are, for example, substantially flat surfaces orthogonal to the thickness direction Z. The second barrier layer 10*b* has the second end surfaces 16*b* connecting the fifth main surface 12*b* and the sixth main surface 14*b*. The second end surfaces 16*b* are, for example, flat surfaces extending in the thickness direction Z. The second end surfaces 16*b* are located along the outer periphery of the wavelength conversion member 100 in a plan view. Each second end surface 16*b* is coplanar with a corresponding one of the first end surfaces 16*a* of the first barrier layer 10*a*, and a corresponding one of the third end surfaces 36 of the inorganic member 30, a corresponding one of the fourth end surfaces 46*a* of the first resin layer 40*a*, and a corresponding one of the fifth end surfaces 46*b* of the second resin layer 40*b*, which are to be described later.

Inorganic Member

The inorganic member 30 is, for example, a member having a high barrier function against moisture, oxygen, and the like. With the inorganic member 30 surrounding the lateral surfaces 26 of the wavelength conversion layer 20, entry of moisture, oxygen, and the like from the lateral surfaces 26 of the wavelength conversion layer 20 can be effectively reduced, and degradation in light emission efficiency of the quantum dots contained in the wavelength conversion layer 20 can be reduced. The inorganic member 30 may be made of, for example, a material having a gas permeability of 1 $cc \cdot m^{-2} \cdot 24\ h^{-1} \cdot atm^{-1}$ or less, and may be made of a metal material such as aluminum or stainless steel, glass, or the like. In particular, the inorganic member 30 is preferably made of a metal material. With the inorganic member 30 made of a ductile metal material, a crack or the like on the surface of the inorganic member 30 is less likely to occur even if the wavelength conversion member 100 comes into contact with a frame or a positioning member of a liquid crystal display device, for example when the wavelength conversion member 100 is placed in the liquid crystal display device. As a result, significant degradation of the barrier function for the wavelength conversion member 100 is less likely occur.

The inorganic member 30 has a seventh main surface 32 facing the fourth main surface 14*a* of the first barrier layer 10*a*, and an eighth main surface 34 on a side opposite the seventh main surface 32 and facing the fifth main surface 12*b* of the second barrier layer 10*b*. The seventh main surface 32 and the eighth main surface 34 are positioned opposite to each other in the thickness direction Z. The seventh main surface 32 and the eighth main surface 34 are, for example, substantially flat surfaces orthogonal to the thickness direction Z. An average thickness D2 of the inorganic member 30 is, for example, in a range from 60% to 100%, and preferably in a range from 90% to 98% of the average thickness of the wavelength conversion member 100. The average thickness D2 of the inorganic member 30 is, for example, in a range from 60% to 100%, and preferably in a range from 90% to 98% of the average thickness D1 of the wavelength conversion layer 20. Further, the average thickness D2 of the inorganic member 30 may be, for example, in a range from 50 μm to 150 μm, and preferably in a range from 80 μm to 120 μm, or in a range from 90 μm to 98 μm. The average thickness D2 of the inorganic member 30 can also be regarded as an average distance between the seventh main surface 32 and the eighth main surface 34. The average thickness D2 of the inorganic member 30 is determined, for example, by calculating an arithmetic average value of thicknesses at any three positions measured using a laser displacement sensor or the like.

The inorganic member 30 has inner end surfaces 38, connecting the seventh main surface 32 and the eighth main surface 34 and each facing a corresponding one of the lateral surfaces 26 of the wavelength conversion layer 20, and outer end surfaces 36 (third end surfaces 36), connecting the seventh main surface 32 and the eighth main surface 34 and each positioned opposite to a corresponding one of the inner end surfaces. Each of the inner end surface and the outer end surface may be a flat surface extending in the thickness direction Z. The inner end surfaces of the inorganic member 30 face the lateral surfaces 26 along the outer periphery of the wavelength conversion layer 20. In the wavelength conversion member 100 illustrated in FIG. 1B, an inner end surface 38 of the inorganic member 30 is located close to a corresponding lateral surface 26 of the wavelength conversion layer 20. The outer end surfaces 36 of the inorganic member 30 are located along the outer periphery of the wavelength conversion member 100 in a plan view. Each outer end surface 36 of the inorganic member 30 may be a part of a corresponding one of the end surfaces of the wavelength conversion member 100. For example, the inorganic member 30 is annularly disposed along the outer periphery of the wavelength conversion member 100 in a plan view. In the cross section taken along the line A-A, the distance W between an inner end surface 38 and a corresponding outer end surface 36 of the inorganic member 30 is, for example, in a range from 100 μm to 1 mm, preferably 200 μm or more, and 500 μm or less or 300 μm or less.

The inner end surfaces 38 and/or the outer end surfaces 36 of the inorganic member 30 may have a cutting protrusion that will be described later. For example, with the cutting protrusion on the inner end surfaces, when the wavelength conversion layer is placed inward of the annular inorganic member, the wavelength conversion layer is less likely to move in the inner region, and thus the arrangement accuracy of the wavelength conversion layer can be improved. The cut portion is formed when the inorganic member is cut out from a frame in the method for manufacturing the wavelength conversion member that will be described below.

First Resin Layer

The first resin layer 40*a* has, for example, a barrier function against moisture, oxygen, and the like, and is made of a material having high adhesion with the first barrier layer 10*a* and the inorganic member 30. With the first resin layer 40*a* having a barrier function and adhesion, moisture, oxygen, and the like entering from between the first barrier layer 10*a* and the inorganic member 30 can be inhibited from reaching the wavelength conversion layer 20, which allows for reducing degradation in light emission efficiency of the quantum dots contained in the wavelength conversion layer 20.

The first resin layer 40*a* is disposed between the first barrier layer 10*a* and the inorganic member 30, and connects the first barrier layer 10*a* and the inorganic member 30. One main surface of the first resin layer 40*a* is adhered to the fourth main surface 14*a* of the first barrier layer 10*a*, and the other main surface is adhered to the seventh main surface 32 of the inorganic member 30. The average thickness of the first resin layer 40*a* is, for example, in a range from 0.5% to 10%, and preferably in a range from 0.8% to 2% of the average thickness of the wavelength conversion member 100. The average thickness of the first resin layer 40*a* is, for example, in a range from 0.5% to 10%, and preferably in a range from 0.8% to 2% of the average thickness of the inorganic member 30.

The first resin layer 40*a* may further include a portion extending to at least a part of a region between the first barrier layer 10*a* and the wavelength conversion layer 20. With the first resin layer 40*a* extending to a part of the region between the first barrier layer 10*a* and the wavelength conversion layer 20, reduction in the variation in the overall thickness of the wavelength conversion member can be facilitated. The first resin layer 40*a* may further include a portion extending to at least a part of a region between a lateral surface 26 of the wavelength conversion layer 20 and a corresponding inner end surface 38 of the inorganic member 30. With the first resin layer 40*a* extending to a part of a region between a lateral surface 26 of the wavelength conversion layer 20 and a corresponding inner end surface 38 of the inorganic member 30, moisture, oxygen, and the like can be inhibited from reaching the wavelength conversion layer 20, which allows for reducing degradation in light emission efficiency of the quantum dots contained in the wavelength conversion layer 20. In addition, the fixing strength between the wavelength conversion layer 20 and the inorganic member 30 improves.

Second Resin Layer

The second resin layer 40*b* has, for example, a barrier function against moisture, oxygen, and the like, and is made of a material having high adhesion with the second barrier layer 10*b* and the inorganic member 30. With the second resin layer 40*b* having a barrier function and adhesion, moisture, oxygen, and the like entering from between the second barrier layer 10*b* and the inorganic member 30 can be inhibited from reaching the wavelength conversion layer 20, which allows for reducing degradation in light emission efficiency of the quantum dots contained in the wavelength conversion layer 20.

The second resin layer 40*b* is disposed between the second barrier layer 10*b* and the inorganic member 30, and connects the second barrier layer 10*b* and the inorganic member 30. One main surface of the second resin layer 40*b* is adhered to the fifth main surface 12*b* of the second barrier layer 10*b*, and the other main surface is adhered to the eighth main surface 34 of the inorganic member 30. The average thickness of the second resin layer 40*b* is, for example, in a range from 0.5% to 10%, and preferably in a range from 0.8% to 2% of the average thickness of the wavelength conversion member 100. The average thickness of the second resin layer 40*b* is, for example, in a range from 0.5% to 10%, and preferably in a range from 0.8% to 2% of the average thickness of the inorganic member 30.

The second resin layer 40*b* may further include a portion extending to at least a part of a region between the second barrier layer 10*b* and the wavelength conversion layer 20. The second resin layer 40*b* extending to a part of a region between the second barrier layer 10*b* and the wavelength conversion layer 20 makes it easy to reduce the variation in the overall thickness of the wavelength conversion member. The second resin layer 40*b* may further include a portion extending to at least a part of a region between a lateral surface 26 of the wavelength conversion layer 20 and an inner end surface 38 of the inorganic member 30. With the second resin layer 40*b* extending to a part of a region between a lateral surface 26 of the wavelength conversion layer 20 and an inner end surface 38 of the inorganic member 30, moisture, oxygen, and the like can be inhibited from reaching the wavelength conversion layer 20, which allows for reducing degradation in light emission efficiency of the quantum dots contained in the wavelength conversion layer 20. In addition, the fixing strength between the wavelength conversion layer 20 and the inorganic member 30 improves.

Next, materials of the first barrier layer 10*a*, the second barrier layer 10*b*, the inorganic member 30, the first resin layer 40*a*, the second resin layer 40*b*, and the wavelength conversion layer 20 will be described in detail.

First Barrier Layer and Second Barrier Layer

The same material can be employed for the first barrier layer 10*a* and the second barrier layer 10*b*. The oxygen transmission rate of the first barrier layer 10*a* and the second barrier layer 10*b* may be, for example, 0.5 $cm^3 \cdot m^{-2} \cdot 24\ h^{-1} \cdot atm^{-1}$ or less, preferably 0.3 $cm^3 \cdot m^{-2} \cdot 24\ h^{-1} \cdot atm^{-1}$ or less, or 0.1 $cm^3 \cdot m^{-2} \cdot 24\ h^{-1} \cdot atm^{-1}$ or less.

The oxygen transmission rate of the first barrier layer 10*a* and the second barrier layer 10*b* can be measured using an oxygen transmission rate measuring device (for example, OX-TRAN manufactured by MOCON Inc.) under conditions of a temperature of 23° C. and a relative humidity of 65%. The oxygen transmission rate of the first barrier layer and the second barrier layer are measured in a direction orthogonal to the main surface.

The barrier film having the inorganic layer constituting the first barrier layer 10*a* and the second barrier layer 10*b* may include, for example, a substrate film and an inorganic layer provided on at least one main surface of the substrate film. For example, the first barrier layer 10*a* and the second barrier layer 10*b* may be laminated films including two substrate films and an inorganic layer disposed between the two substrate films. Examples of the constituent material of the substrate film include thermoplastic resins such as polyester (for example, polyethylene terephthalate and polyethylene naphthalate), cellulose triacetate, cellulose diacetate, cellulose acetate butyrate, polyamide, polyimide, polyether sulfone, polysulfone, polypropylene, polymethylpentene, polyvinyl chloride, polyvinyl acetal, polyether ketone, polymethyl methacrylate, polycarbonate, and polyurethane.

Preferable examples of the constituent material of the substrate film include polyester and cellulose triacetate.

The average thickness of the substrate film may be, for example, in a range from 10 μm to 150 μm, and preferably in a range from 20 μm to 125 μm.

When the average thickness of the substrate film is 10 μm or more, occurrence of wrinkles and folds during assembly and handling of the wavelength conversion member is effectively reduced. When the thickness is 150 μm or less, it can contribute to weight reduction and reduction in thickness of the image display device.

The substrate film may be formed of a single film or may be a laminated film formed of a plurality of films. Such a laminated film may be formed of a plurality of layers including films of the same type of raw materials or may be formed of a plurality of layers including films of different types of raw materials depending on the application.

The inorganic layer may be, for example, a film made of an inorganic compound such as an oxide, a nitride, an oxynitride, or a carbide. Specific examples thereof include metal oxides such as aluminum oxide, magnesium oxide, tantalum oxide, zirconium oxide, titanium oxide, and indium tin oxide (ITO); metal nitrides such as aluminum nitride; metal carbides such as aluminum carbide; silicon oxide materials such as silicon oxide, silicon oxynitride, silicon oxycarbide, and silicon oxynitride carbide; silicon nitride materials such as silicon nitride and silicon nitride carbide; silicon carbide materials such as silicon carbide; and hydrides thereof. The inorganic layer may be made of one inorganic compound or two or more inorganic compounds.

The average thickness of the inorganic layer may be, for example, in a range from 10 nm to 200 nm, and preferably in a range from 10 nm to 100 nm, or in a range from 15 nm to 75 nm.

The inorganic layer may be formed by a known method according to a forming material. Specific examples thereof include plasma CVD methods such as CCP-CVD and ICP-CVD, sputtering methods such as magnetron sputtering and reactive sputtering, vacuum deposition methods, and vapor phase deposition methods.

The surfaces of the first barrier layer 10*a* and the second barrier layer 10*b* may be subjected to prism processing. For example, a surface of the second barrier layer 10*b* positioned on the emission face side of the wavelength conversion member 100 is subjected to prism processing in an array. With this structure, light can be efficiently emitted from the emission surface of the wavelength conversion member 100. The first barrier layer 10*a* positioned on the incident surface side of the wavelength conversion member 100 may be provided with a reflection mechanism that transmits light having a specific wavelength and reflects light having a wavelength other than the specific wavelength. The first barrier layer 10*a* may include, for example, a dichroic mirror layer. With this structure, light reflected in the wavelength conversion member 100 and then returning to the incident surface side of the wavelength conversion member 100 can be reflected toward the emission surface by the reflection mechanism.

The reflection mechanism may be provided in the second barrier layer 10*b*.

Inorganic Member

The moisture transmission rate of the inorganic member may be, for example, 1 $g \cdot m^{-2} \cdot 24\ h^{-1} \cdot atm^{-1}$ or less, preferably $1\times10^{-3}$ $g \cdot m^{-2} \cdot 24\ h^{-1} \cdot atm^{-1}$ or less, or $1\times10^{-5}$ $g \cdot m^{-2} \cdot 24$ h $1 \cdot atm^{-1}$ or less. The moisture transmission rate of the inorganic member can be measured by atmospheric pressure ionization mass spectrometry (API-MS method) under conditions of a temperature of 23° C. and a relative humidity of 65%. In addition, the moisture transmission rate of the inorganic member is measured in a direction from the end side toward the inside of the wavelength conversion member in a cross section (for example, the cross section taken along the line A-A) orthogonal to the first main surface of the wavelength conversion layer and passing through the wavelength conversion layer, the first barrier layer, and the second barrier layer.

The gas permeability of the inorganic member may be, for example, 1 $cc \cdot m^{-2} \cdot 24$ h-1$\cdot atm^{-1}$ or less, preferably $1\times10^{-3}$ $cc \cdot m^{-2} \cdot 24\ h^{-1} \cdot atm^{-1}$ or less, or $1\times10^{-5}$ $cc \cdot m^{-2} \cdot 24\ h^{-1} \cdot atm^{-1}$ or less. The gas permeability of the inorganic member can be measured by atmospheric pressure ionization mass spectrometry (API-MS method) under conditions of a temperature of 23° C. and a relative humidity of 65%. In addition, the gas permeability of the inorganic member is measured in a direction from the end side of the wavelength conversion member toward the inside of the wavelength conversion member in a cross section (for example, the cross section taken along the line A-A) orthogonal to the first main surface of the wavelength conversion layer and passing through the wavelength conversion layer, the first barrier layer, and the second barrier layer.

The oxygen transmission rate of the inorganic member may be, for example, 1 $cc \cdot m^{-2} \cdot 24\ h^{-1} \cdot atm^{-1}$ or less, preferably $1\times10^{-3}$ $cc \cdot m^{-2} \cdot 24\ h^{-1} \cdot atm^{-1}$ or less, or $1\times10^{-5}$ $cc \cdot m^{-2} \cdot 24\ h^{-1} \cdot atm^{-1}$ or less. The oxygen transmission rate of the inorganic member can be measured in the same manner as the gas permeability. In addition, the oxygen transmission rate of the inorganic member is measured in a direction from the end side of the wavelength conversion member toward the inside of the wavelength conversion member in a cross section (for example, the cross section taken along the line A-A) orthogonal to the first main surface of the wavelength conversion layer and passing through the wavelength conversion layer, the first barrier layer, and the second barrier layer.

The material of the inorganic member may be any material that can achieve at least one of desired gas permeability, oxygen transmission rate, or moisture transmission rate, and may be a material that can achieve at least a desired gas permeability. Examples of the material of the inorganic member include metal, glass, and ceramic, and the material may be at least one selected from the group consisting of metal and glass. Examples of the metal include aluminum and stainless steel. The material of the inorganic member is preferably a ductile metal. Using a ductile material for the inorganic member allows for inhibiting formation of a part that permeates a gas due to breaking or cracking caused by physical or thermal impact. Accordingly, rapid deterioration of gas permeability due to impact in the wavelength conversion member can be effectively inhibited.

The surface of the inorganic member may be smooth, or a recess may be arranged at the surface. The recess may be arranged, for example, at the seventh main surface and/or the eighth main surface of the inorganic member.

When a recess is arranged at the surface of the inorganic member, the depth of the recess may be, for example, in a range from 0.1 μm to 10 μm, and preferably in a range from 0.5 μm to 5 μm. The depth of the recess may be, for example, in a range from 0.2% to 20%, and preferably in a range from 1% to 10% of the thickness of the inorganic member. The recess of the inorganic member is formed by, for example, wet etching. Further, fine irregularities may be formed on the surface of the inorganic member by, for example, blast treatment.

First Resin Layer and Second Resin Layer

The same material can be employed for the first resin layer and the second resin layer. The material forming the first resin layer and the second resin layer preferably has a gas barrier function. The oxygen transmission rate of the material forming the first resin layer and the second resin layer may be, for example, 2.5 $g \cdot m^{-2} \cdot 24\ h^{-1} \cdot atm^{-1}$ or less, preferably 1.5 $g \cdot m^{-2} \cdot 24\ h^{-1} \cdot atm^{-1}$ or less, or 0.5 $g \cdot m^{-2} \cdot 24\ h^{-1} \cdot atm^{-1}$ or less. The moisture transmission rate of the material forming the first resin layer and the second resin layer may be, for example, 10 $g \cdot m^{-2} \cdot 24\ h^{-1} \cdot atm^{-1}$ or less, preferably 5 $g \cdot m^{-2} \cdot 24\ h^{-1} \cdot atm^{-1}$ or less, or 1 $g \cdot m^{-2} \cdot 24\ h^{-1} \cdot atm^{-1}$ or less.

The material forming the first resin layer and the second resin layer is preferably a material having high adhesion to the first barrier layer, the second barrier layer, and the inorganic member in addition to the gas barrier function. Examples of the material of the first resin layer and the second resin layer include an epoxy resin, a polyvinyl chloride resin, and a polyvinylidene chloride resin.

The first resin layer and the second resin layer may further contain an inorganic filler as necessary to the extent that the adhesion is not impaired. When the first resin layer and the second resin layer contain an inorganic filler having low moisture transmission rate, entry of gases such as moisture and oxygen can be more effectively inhibited.

Wavelength Conversion Layer

As described above, the wavelength conversion layer 20 contains quantum dots. Quantum dots are semiconductor crystal particles having a particle size of about several nanometers to several tens of nanometers. When the size of a substance is reduced to the order of nanometers, electrons can be present only in a limited state in the substance. Thus, the electron state becomes discrete, and the band gap changes depending on the particle size. The quantum dots absorb light and emit light having a wavelength corresponding to their bandgap energy. Thus, the emission wavelength of the quantum dots can be controlled by controlling the particle size, the crystal composition, and the like, and the quantum dots function as a wavelength conversion material. The particle size of the quantum dots contained in the wavelength conversion layer 20 is, for example, in a range from 5 nm to 50 nm, and preferably in a range from 5 nm to 25 nm.

In the present specification, the particle size of the semiconductor nanoparticles constituting the quantum dots refers to a line segment connecting any two points on the outer periphery of a particle observed in a transmission electron microscope (TEM) image, and refers to the longest line segment among line segments passing through the center of the particle. In the present specification, the average particle size of the semiconductor nanoparticles refers to an arithmetic average value of particle sizes of semiconductor nanoparticles observed in a TEM image whose particle sizes can be measured.

When the semiconductor nanoparticles have a rod-like shape, the length of the minor axis is regarded as the particle size. As used herein, the "rod-shaped particle" refers to a particle, when its surface including the major axis of the particle is observed, having a shape observed as a quadrangular shape including an rectangular-shape part (having a cross section of a circular shape, an elliptical shape, or a polygonal shape), an elliptical shape, a polygonal shape (for example, a pencil-like shape), or the like that is elongated in one direction, in which a ratio of the length of the major axis to the length of the minor axis is larger than 1.2. For the rod-shaped particle, the length of the major axis refers to the longest line segment among line segments connecting any two points on the outer periphery of the particle in the case of the elliptical shape, and refers to the longest line segment among line segments parallel to the longest side among the sides defining the outer periphery and connecting any two points on the outer periphery of the particle in the case of the quadrangular or polygonal shape. The length of the minor axis refers to the length of the longest line segment of the line segments connecting any two points on the outer perimeter, the line segment thereof being orthogonal to the line segment defining the length of the major axis. Specifically, the average particle size of the semiconductor nanoparticles is determined by measuring the particle sizes of all measurable semiconductor nanoparticles observed in a TEM image in a range from 50000 times to 150000 times, and calculating the arithmetic average of the measured particle sizes. As used herein, the "measurable" particle refers to a particle in which the outline of the entire particle can be observed in a TEM image. Thus, in the TEM image, a particle having a part not included in the imaging area, such as a particle that appears to be "cut" in the imaging area, is regarded as not measurable. When the number of nanoparticles appearing in one TEM image is 100 or greater in total, the average particle size is determined using one TEM image. When the number of nanoparticles appearing in one TEM image is small, the imaging location is changed, a TEM image is further acquired, and the particle sizes of 100 or more particles appearing in two or more TEM images are measured to determine the average particle size.

Specific examples of the quantum dot include a perovskite-based quantum dot, a chalcopyrite-based quantum dot, and a group III-V semiconductor-based quantum dot. The perovskite-based quantum dot may contain, for example, a compound represented by the following Formula (1).

$$[M^1_w A^1_{(1-w)}]xM^2_y X_z \qquad (1)$$

In Formula (1), $M^1$ represents a first element containing at least one selected from the group consisting of Cs, Rb, K, Na, and Li. $A^1$ represents a non-metal cation including at least one selected from the group consisting of an ammonium ion, a formamidinium ion, a guanidium ion, an imidazolium ion, a pyridinium ion, a pyrrolidinium ion, and a protonated thiourea ion. $M^2$ represents a second element containing at least one selected from the group consisting of Ge, Sn, Pb, Sb, and Bi. X represents an anion or ligand including at least one selected from the group consisting of a chloride ion, a bromide ion, an iodide ion, a cyanide ion, a thiocyanate, an isothiocyanate, and a sulfide.

x is a number in a range from 1 to 4, y is a number in a range from 1 to 2, z is a number in a range from 3 to 9, and w is a number in a range from 0 to 1. In Formula (1), when both the first element $M^1$ and the non-metal cation $A^1$ are contained, both the first element $M^1$ and the non-metal cation $A^1$ represent an atomic group constituting a ligand.

The ammonium ion may be represented by, for example, the following Formula (A-1). The formamidinium ion may be represented by, for example, the following Formula (A-2). The guanidinium ion may be represented by, for example, the following Formula (A-3). The protonated thiourea ion may be represented by, for example, the following Formula (A-4). The imidazolium ion may be represented by, for example, the following Formula (A-5). The pyridinium ion may be represented by, for example, the following Formula (A-6). The pyrrolidinium ion may be represented by, for example, the following Formula (A-7). In each formula representing a non-metal cation, each R independently represents at least one selected from the group consisting of a hydrogen atom, an alkyl group having 1 to 4 carbon atoms, a phenyl group, a benzyl group, a halogen atom, and a pseudohalogen. Any two Rs in each formula may be bonded to each other to form a nitrogen-containing aliphatic ring having 3 to 6 carbon atoms.

$[R_4N^+]$ (A-1)

$[(NR_2)_2RC^+]$ (A-2)

$[(NR_2)_3C^+]$ (A-3)

$[(NR_2)_2C^+—SR]$ (A-4)

(A-5)

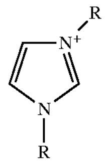

-continued (A-6)

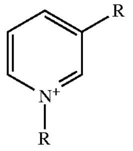

(A-7)

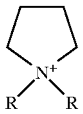

The perovskite-based quantum dot containing the compound having the composition represented by Formula (1) emits green light or red light when irradiated with light from a light source. For green light, the perovskite-based quantum dot may emit light having an emission peak wavelength in a range from 475 nm to 560 nm when irradiated with light from a light source having an emission peak wavelength in a range from 380 nm to 545 nm, for example. The peak emission wavelength of the perovskite-based quantum dot that emits green light may be preferably in a range from 510 nm to 550 nm, or in a range from 525 nm to 535 nm. For red light, light having an emission peak wavelength in a range from 600 nm to 680 nm may be emitted when the quantum dot is irradiated with light from a light source having an emission peak wavelength in a range from 380 nm to 545 nm, for example. The emission peak wavelength of the perovskite-based quantum dot that emits red light may be preferably in a range from 610 nm to 670 nm, or in a range from 625 nm to 635 nm. The half-value width in the emission spectrum of the perovskite-based quantum dot may be, for example, 35 nm or less, and preferably 30 nm or less, or 25 nm or less. The perovskite-based quantum dot may exhibit band edge emission in the emission spectrum.

A first aspect of the chalcopyrite-based quantum dot may include, for example, a first semiconductor containing silver (Ag), indium (In), gallium (Ga), and sulfur(S), and a second semiconductor containing Ga and S may be disposed on a surface of the first semiconductor. The second semiconductor may further contain Ag. The first semiconductor may be a semiconductor having a chalcopyrite-type structure containing Ag, In, Ga, and S. In the first aspect of the chalcopyrite-based quantum dot, an adhering substance containing the second semiconductor may be disposed on the surface of the particle containing the first semiconductor, and the adhering substance containing the second semiconductor may cover the particle containing the first semiconductor. Further, the chalcopyrite-based quantum dot may have, for example, a core-shell structure in which a particle containing the first semiconductor is used as a core and an adhering substance containing the second semiconductor is used as a shell, and the shell is disposed on the surface of the core. For details of the chalcopyrite-based quantum dot of the first aspect, for example, the description of JP 2018-044142 A, WO 2022/191032, or the like can be referred to.

The first semiconductor contains at least Ag, and a part thereof may be substituted to further contain at least one of copper (Cu), gold (Au), or an alkali metal (hereinafter, it may be referred to as Ma), or may be substantially formed of Ag. Here, "substantially" means that the ratio of the number of atoms of the element substituting Ag other than Ag to the total number of atoms of Ag and the element substituting Ag other than Ag is, for example, 10% or less, preferably 5% or less, and more preferably 1% or less. The first semiconductor may substantially contain Ag and an alkali metal as constituent elements. Here, "substantially" means that the ratio of the number of atoms of an element substituting Ag other than Ag and an alkali metal to the total number of atoms of Ag, an alkali metal, and an element substituting Ag other than Ag and an alkali metal is, for example, 10% or less, preferably 5% or less, and more preferably 1% or less. The alkali metal includes lithium (Li), sodium (Na), potassium (K), rubidium (Rb), and cesium (Cs).

The first semiconductor may have, for example, a composition represented by the following Formula (2a).

$$(Ag_p M^a_{(1-p)})_q In_r Ga_{(1-r)} S_{(q+3)/2} \quad (2a)$$

Here, p, q and r meet $0<p\leq 1$, $0.20<q\leq 1.2$, and $0<r<1$. $M^a$ represents alkali metal.

In the first aspect of the chalcopyrite-based quantum dot, the second semiconductor may be disposed on the surface. The second semiconductor may include a semiconductor having band gap energy larger than that of the first semiconductor. The second semiconductor may be a semiconductor substantially made of Ga and S. The second semiconductor may be a semiconductor substantially made of Ag, Ga, and S. Here, "substantially" means that when the total number of atoms of all elements contained in the semiconductor containing Ga and S or the semiconductor containing Ag, Ga, and S is 100%, the ratio of the number of atoms of elements other than Ga and S or elements other than Ag, Ga, and S is, for example, 10% or less, preferably 5% or less, and more preferably 1% or less.

The chalcopyrite-based quantum dot of the first aspect may exhibit band edge emission having an emission peak wavelength in a range from 475 nm to 560 nm (for example, green) when irradiated with light from a light source having an emission peak wavelength in a range from 380 nm to 545 nm for example, and the emission peak wavelength may be preferably in a range from 510 nm to 550 nm, or in a range from 525 nm to 535 nm. In the chalcopyrite-based quantum dot of the first aspect, the half-value width in the emission spectrum may be, for example, 45 nm or less, and preferably 40 nm or less or 30 nm or less. The half-value width may be, for example, 15 nm or more.

A second aspect of the chalcopyrite-based quantum dot may include, for example, a third semiconductor containing copper (Cu), silver (Ag), indium (In), gallium (Ga), and sulfur(S), and a fourth semiconductor containing Ga and S may be disposed on the surface of the third semiconductor. The fourth semiconductor may further include Ag. The third semiconductor may be a semiconductor having a chalcopyrite-type structure containing Cu, Ag, In, Ga, and S. In the second aspect of the chalcopyrite-based quantum dot, an adhering substance containing the fourth semiconductor may be disposed on the surface of the particle containing the third semiconductor, and the adhering substance containing the fourth semiconductor may cover the particle containing the third semiconductor. Further, the chalcopyrite-based quantum dot may have, for example, a core-shell structure in which a particle containing the third semiconductor is used as a core and an adhering substance containing the fourth semiconductor is used as a shell, and the shell is disposed on the surface of the core. For details of the chalcopyrite-based quantum dot of the second aspect, for example, the description of WO 2020/162622, WO 2023/013361, and the like can be referred to.

The third semiconductor contains at least Ag and Cu, and a part thereof may be substituted to contain gold (Au) and an alkali metal (Ma).

The third semiconductor may substantially contain Ag, Cu, and an alkali metal as constituent elements. Here, "substantially" means that the ratio of the number of atoms of elements other than Ag, Cu, and alkali metals to the total number of atoms of Ag, Cu, and alkali metals and elements other than Ag, Cu, and alkali metals is, for example, 10% or less, preferably 5% or less, and more preferably 1% or less.

The third semiconductor may have, for example, a composition represented by the following Formula (2b).

$$(Ag_sCu_{(1-s)})_tIn_uGa_{(1-u)}S_{(t+3)/2} \quad (2b)$$

Here, s, t, and u satisfy 0<<<1, 0.20<<1.2, and 0<u<1.

In the second aspect of the chalcopyrite-based quantum dot, the fourth semiconductor may be disposed on the surface.

The fourth semiconductor may include a semiconductor having band gap energy larger than that of the third semiconductor. The fourth semiconductor may be a semiconductor substantially made of Ga and S. The fourth semiconductor may be a semiconductor substantially made of Ag, Ga, and S. Here, "substantially" means that when the total number of atoms of all elements contained in the semiconductor containing Ga and S or the semiconductor containing Ag, Ga, and S is 100%, the ratio of the number of atoms of elements other than Ga and S or elements other than Ag, Ga, and S is, for example, 10% or less, preferably 5% or less, and more preferably 1% or less.

The chalcopyrite-based quantum dot of the second aspect may exhibit band edge emission having an emission peak wavelength in a range from 600 nm to 680 nm (for example, red) when irradiated with light from a light source having an emission peak wavelength in a range from 380 nm to 545 nm for example, and the emission peak wavelength may be preferably in a range from 610 nm to 670 nm, in a range from 620 nm to 660 nm, or in a range from 625 nm to 635 nm. In the chalcopyrite-based quantum dot of the second aspect, the half-value width in the emission spectrum may be, for example, 70 nm or less, and preferably 65 nm or less, 60 nm or less, or 30 nm or less. The half-value width may be, for example, 15 nm or more.

A third aspect of the chalcopyrite-based quantum dot may include, for example, a fifth semiconductor containing silver (Ag), gallium (Ga), and selenium (Se), and a sixth semiconductor containing zinc (Zn) and S (sulfur) may be disposed on the surface of the fifth semiconductor. The fifth semiconductor contains at least Ag, Ga, and Se, and a part thereof may be substituted to contain indium (In) and sulfur(S).

The sixth semiconductor may further contain at least one of Ga or Se. The fifth semiconductor may be a semiconductor having a chalcopyrite-type structure containing Ag, Ga, and Se. In the third aspect of the chalcopyrite-based quantum dot, an adhering substance containing the sixth semiconductor may be disposed on the surface of the particle containing the fifth semiconductor, and the adhering substance containing the sixth semiconductor may cover the particle containing the fifth semiconductor. Further, the chalcopyrite-based quantum dot may have, for example, a core-shell structure in which a particle containing the fifth semiconductor is used as a core and an adhering substance containing the sixth semiconductor is used as a shell, and the shell is disposed on the surface of the core. For details of the chalcopyrite-based quantum dot of the third aspect, for example, the description of WO 2021/039290 can be referred to.

The fifth semiconductor contains at least Ag, Ga, and Se, and a part thereof may be substituted to contain indium (In) and sulfur(S).

The fifth semiconductor may have, for example, a composition represented by the following Formula (2c).

$$AgIn_xGa_{1-x}S_ySe_{1-y} \quad (2c)$$

Here, x and y satisfy 0≤x<1 and 0≤y≤1.

In the third aspect of the chalcopyrite-based quantum dot, the sixth semiconductor may be disposed on the surface.

The sixth semiconductor may include a semiconductor having band gap energy larger than that of the fifth semiconductor. The sixth semiconductor may be a semiconductor substantially made of Zn and S. Here, "substantially" means that the ratio of the number of atoms of elements other than Zn and S is, for example, 10% or less, preferably 5% or less, and more preferably 1% or less when the total number of atoms of all elements contained in the semiconductor containing Zn and S is 100%.

The chalcopyrite-based quantum dot of the third aspect may exhibit band edge emission having an emission peak wavelength in a range from 600 nm to 680 nm (for example, red) when irradiated with light from a light source having an emission peak wavelength in a range from 380 nm to 545 nm for example, and the emission peak wavelength may be preferably in a range from 610 nm to 670 nm, or in a range from 625 nm to 635 nm. In the chalcopyrite-based quantum dot of the third aspect, the half-value width in the emission spectrum may be, for example, 50 nm or less, and preferably 40 nm or less or 30 nm or less. The half-value width may be, for example, 15 nm or more.

Indium phosphide (InP)-based quantum dots are an example of semiconductor nanoparticles including group III-V semiconductors. Examples of the group III-V semiconductor include AlN, AlP, AlAs, AlSb, GaAs, GaP, GaN, GaSb, InN, InAs, InP, InSb, TiN, TiP, TiAs, and TiSb.

In the group III-V based quantum dot, an adhering substance containing a seventh semiconductor different from the group III-V semiconductor constituting the semiconductor nanoparticle may be disposed on the surface of the semiconductor nanoparticle containing the group III-V semiconductor, and the adhering substance containing the seventh semiconductor may cover the particle containing the group III-V semiconductor. Further, the group III-V based quantum dot may have, for example, a core-shell structure in which particles containing a group III-V semiconductor are used as a core, and an adhering substance containing the seventh semiconductor is used as a shell, and the shell is disposed on the surface of the core. The seventh semiconductor may be a semiconductor having band gap energy larger than that of the group III-V semiconductor. Examples of the combination of the group III-V semiconductor and the seventh semiconductor include InP/ZnS, GaP/ZnS, InN/GaN, InP/CdSSe, InP/ZnSeTe, InGaP/ZnSe, InGaP/ZnS, InP/ZnSTe, InGaP/ZnSTe, and InGaP/ZnSSe.

The group III-V semiconductor-based (for example, indium phosphide-based) quantum dot may emit green light or red light when irradiated with light from a light source having an emission peak wavelength in a range from 380 nm to 500 nm, for example. The group III-V semiconductor-based quantum dot that emits green light may exhibit band edge emission having an emission peak wavelength in a range from 475 nm to 580 nm when irradiated with light from a light source having an emission peak wavelength in a range from 380 nm to 545 nm for example, preferably a light source having an emission peak wavelength in a range from 380 nm to 500 nm. The peak emission wavelength may be preferably in a range from 510 nm to 570 nm, in a range from 520 nm to 560 nm, or in a range from 525 nm to 535 nm. In addition, the group III-V semiconductor quantum dot emitting red light may exhibit band edge emission having an emission peak wavelength in a range from 600 nm to 680 nm when irradiated with light from a light source having an emission peak wavelength in a range from 380 nm to 545 nm, for example. The peak emission wavelength may be preferably in a range from 610 nm to 670 nm, in a range from 620 nm to 660 nm, or in a range from 625 nm to 635 nm. The group III-V semiconductor-based quantum dot may have a half-value width in its emission spectrum of, for example, 70 nm or less, preferably 65 nm or less, 60 nm or less, or 30 nm or less.

The half-value width may be, for example, 15 nm or more.

The quantum dot may include other quantum dots other than the perovskite-based quantum dot, the chalcopyrite-based quantum dot, and the indium phosphide-based quantum dot as necessary. Examples of the other quantum dots include particles containing at least one selected from the group consisting of a group II-VI semiconductor, a group IV-VI semiconductor, and a group IV semiconductor.

Specific examples of the group II-VI semiconductor include CdSe, CdTe, CdS, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, and HgZnSTe. Specific examples of the group IV-VI semiconductor include SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, and SnPbSTe.

Specific examples of the group IV semiconductor include Si, Ge, SiC, and SiGe.

A surface modifier may be disposed on the surface of the quantum dot. Specific examples of the surface modifier include amino alcohols having 2 to 20 carbon atoms; ionic surface modifiers; nonionic surface modifiers; nitrogen-containing compounds having a hydrocarbon group having 4 to 20 carbon atoms; sulfur-containing compounds having a hydrocarbon group having 4 to 20 carbon atoms; oxygen-containing compounds having a hydrocarbon group having 4 to 20 carbon atoms; phosphorus-containing compounds having a hydrocarbon group having 4 to 20 carbon atoms; and halides containing at least one selected from the group consisting of Group 2 elements, Group 12 elements, and Group 13 elements. As the surface modifier, one type may be used singly, or two or more different surface modifiers may be used in combination.

The amino alcohol used as the surface modifier may be a compound having an amino group and an alcoholic hydroxyl group and containing a hydrocarbon group having 2 to 20 carbon atoms. The number of carbon atoms of the amino alcohol is preferably 10 or less, and more preferably 6 or less. The hydrocarbon group constituting the amino alcohol may be derived from a hydrocarbon such as a linear, branched, or cyclic alkane, alkene, or alkyne. Deriving from a hydrocarbon means that at least two hydrogen atoms are removed from the hydrocarbon to form a hydrocarbon group. Specific examples of the amino alcohol include aminoethanol, aminopropanol, aminobutanol, aminopentanol, aminohexanol, and aminooctanol. For example, the amino group of the amino alcohol is bonded to the surface of the semiconductor nanoparticle, and the hydroxyl group is exposed on the outermost surface of the particle on the opposite side, whereby the polarity of the semiconductor nanoparticle is changed, and the dispersibility in an alcohol-based solvent (for example, methanol, ethanol, propanol, butanol, and the like) is improved.

Examples of the ionic surface modifier used as the surface modifier include nitrogen-containing compounds, sulfur-containing compounds, and oxygen-containing compounds having an ionic functional group in the molecule. The ionic functional group may be either cationic or anionic, and preferably has at least a cationic group. For specific examples of the surface modifier and the method of surface modification, for example, the description in Chemistry Letters, Vol. 45, pp 898-900, 2016 can be referred to.

The ionic surface modifier may be, for example, a sulfur-containing compound having a tertiary or quaternary alkylamino group. The number of carbon atoms of the alkyl group of the alkylamino group may be, for example, in a range from 1 to 4. The sulfur-containing compound may be an alkyl or alkenyl thiol having 2 to 20 carbon atoms. Specific examples of the ionic surface modifier include a hydrogen halide salt of dimethylaminoethanethiol, a halogen salt of trimethylammonium ethanethiol, a hydrogen halide salt of dimethylaminobutanethiol, and a halogen salt of trimethylammonium butanethiol.

Examples of the nonionic surface modifier used as the surface modifier include nitrogen-containing compounds, sulfur-containing compounds, and oxygen-containing compounds having a nonionic functional group containing an alkylene glycol unit, an alkylene glycol monoalkyl ether unit, and the like. The number of carbon atoms of the alkylene group in the alkylene glycol unit may be, for example, in a range from 2 to 8, and is preferably in a range from 2 to 4. The number of repetitions of the alkylene glycol unit may be, for example, in a range from 1 to 20, and is preferably in a range from 2 to 10. The nitrogen-containing compound constituting the nonionic surface modifier may have an amino group, the sulfur-containing compound may have a thiol group, and the oxygen-containing compound may have a hydroxyl group. Specific examples of the nonionic surface modifier include methoxytriethyleneoxyethanethiol and methoxyhexaethyleneoxyethanethiol.

Examples of the nitrogen-containing compound having a hydrocarbon group having 4 to 20 carbon atoms include amines and amides. Examples of the sulfur-containing compound having a hydrocarbon group having 4 to 20 carbon atoms include thiols. Examples of the oxygen-containing compound having a hydrocarbon group having 4 to 20 carbon atoms include carboxylic acids, alcohols, ethers, aldehydes, and ketones. Examples of the phosphorus-containing compound having a hydrocarbon group having 4 to 20 carbon atoms include trialkylphosphine, triarylphosphine, trialkylphosphine oxide, and triarylphosphine oxide.

Examples of the halide containing at least one selected from the group consisting of Group 2 elements, Group 12 elements, and Group 13 elements include magnesium chloride, calcium chloride, zinc chloride, cadmium chloride, aluminum chloride, and gallium chloride.

The quantum dot contained in the wavelength conversion layer may include at least one selected from the group consisting of a first quantum dot having an emission peak wavelength in a range from 475 nm to 560 nm and a second quantum dot having an emission peak wavelength in a range from 600 nm to 680 nm. The quantum dots may include at least one type of the first quantum dot and at least one type of the second quantum dot. The first quantum dot may include, for example, at least one selected from the group consisting of a perovskite-based quantum dot, an indium phosphide-based quantum dot, and the chalcopyrite-based quantum dot of the first aspect. Preferably, the first quantum dot may include at least one selected from the group consisting of the perovskite-based quantum dot and the chalcopyrite-based quantum dot of the first aspect. The second quantum dot may include, for example, at least one selected from the group consisting of a perovskite-based quantum dot, the chalcopyrite-based quantum dot of the second aspect, and an indium phosphide-based quantum dot. Preferably, the second quantum dot may include at least one selected from the group consisting of the chalcopyrite-based quantum dot and the indium phosphide-based quantum dot of the second aspect. When the wavelength conversion layer containing the first quantum dot and the second quantum dot is irradiated with blue light having a wavelength in a range from 420 nm 460 nm for example, green light and red light are emitted from the first quantum dot and the second quantum dot, respectively. As a result, white light is produced by color mixing of green light and red light emitted from the first quantum dot and the second quantum dot, and blue light transmitted through the wavelength conversion layer.

The wavelength conversion layer constituting the laminate may form one layer or two or more layers. For example, when the wavelength conversion layer forms two layers, one wavelength conversion layer may contain the first quantum dot, and the other wavelength conversion layer may contain the second quantum dot. The wavelength conversion layer may contain, for example, a chalcopyrite-based quantum dot that emits green light and a chalcopyrite-based quantum dot that emits red light. The wavelength conversion layer may contain a chalcopyrite-based quantum dot that emits green light and an indium phosphide-based quantum dot that emits red light. The wavelength conversion layer may contain a perovskite-based quantum dot that emits green light and an indium phosphide-based quantum dot that emits red light. The wavelength conversion layer may contain a perovskite-based quantum dot that emits green light and a chalcopyrite-based quantum dot that emits red light. Further, the wavelength conversion layer may include, for example, a layer containing a chalcopyrite-based quantum dot that emits green light and a layer containing a chalcopyrite-based quantum dot that emits red light. The wavelength conversion layer may include a layer containing a chalcopyrite-based quantum dot that emits green light and a layer containing an indium phosphide-based quantum dot that emits red light. The wavelength conversion layer may include a layer containing a perovskite-based quantum dot that emits green light and a layer containing an indium phosphide-based quantum dot that emits red light. The wavelength conversion layer may include a layer containing a perovskite-based quantum dot that emits green light and a layer containing a chalcopyrite-based quantum dot that emits red light.

The wavelength conversion layer may contain at least one type of phosphor as a light emitting material other than the quantum dots as necessary in addition to the quantum dots. As the phosphor, for example, a garnet-based phosphor such as aluminum garnet can be used. Examples of the garnet-based phosphor include cerium-activated yttrium-aluminum-garnet-based phosphors and cerium-activated lutetium-aluminum-garnet-based phosphors. In addition to the garnet-based phosphor, a europium and/or chromium-activated nitrogen-containing calcium aluminosilicate-based phosphor, a europium-activated silicate-based phosphor, a β-SiAlON-based phosphor, a nitride-based phosphor such as a CASN-based or SCASN-based phosphor, a rare-earth nitride-based phosphor such as a $LnSi_3N_{11}$-based or LnSiAlON-based phosphor, an oxynitride-based phosphor such as a $BaSi_2O_2N_2$:Eu-based or $Ba_3Si_6O_{12}N_2$:Eu-based phosphor, a sulfide-based phosphor such as CaS-based phosphor, $SrGazS_4$-based phosphor, or ZnS-based phosphor, a chlorosilicate-based phosphor, a $SrLiAl_3N_4$:Eu phosphor, a $SrMg_3SiN_4$:Eu phosphor, a $K_2SiF_6$:Mn phosphor and a $K_2(Si, Al)F_6$:Mn phosphor (for example, $K_2Si_{0.99}Al_{0.01}F_{5.99}$:Mn) as a manganese-activated fluoride complex phosphor, can be used. In the present specification, a plurality of elements separated by commas (,) in a formula representing the composition of the phosphor means that at least one element among the plurality of elements is contained in the composition. In a formula representing the composition of the phosphor, characters preceding the colon (:) represent a host crystal, and characters following the colon (:) represent an activating element.

The wavelength conversion layer may contain, for example, a chalcopyrite-based quantum dot that emits green light and a manganese-activated fluoride complex phosphor that emits red light, and may contain a perovskite-based quantum dot that emits green light and a manganese-activated fluoride complex phosphor that emits red light. The wavelength conversion layer may include a layer containing a chalcopyrite-based quantum dot that emits green light and a layer containing a manganese-activated fluoride complex phosphor that emits red light. Further, the wavelength conversion layer may include a layer containing a perovskite-based quantum dot that emits green light and a layer containing a manganese-activated fluoride complex phosphor that emits red light.

The wavelength conversion layer may contain a cured resin in addition to the quantum dots. The cured resin may be a cured product of a photocurable composite to be described later. The content of the quantum dots contained in the wavelength conversion layer may be, for example, in a range from 0.01 mass % to 1.0 mass %, and preferably in a range from 0.05 mass % to 0.5 mass %, or in a range from 0.1 mass % to 0.5 mass % with respect to the total amount of the cured resin. When the content of the quantum dots is 0.01 mass % or more, sufficient light emission intensity tends to be achieved when light is irradiated, and when the content of the quantum dots is 1.0 mass % or less, aggregation of the quantum dots is inhibited, and emission color unevenness tends to be reduced.

The photocurable composition that forms the cured resin may contain, for example, a (meth)acrylic compound. The (meth)acrylic compound may be a monofunctional (meth) acrylic compound having one (meth)acryloyl group in one molecule, or may be a polyfunctional (meth)acrylic compound having two or more (meth)acryloyl groups in one molecule. As the (meth)acrylic compound, one type may be used singly, two or more types may be used in combination, or a monofunctional (meth)acrylic compound and a polyfunctional (meth)acrylic compound may be used in combination.

Second Embodiment

A wavelength conversion member 110 according to a second embodiment will be described with reference to FIG.

Figure 2:
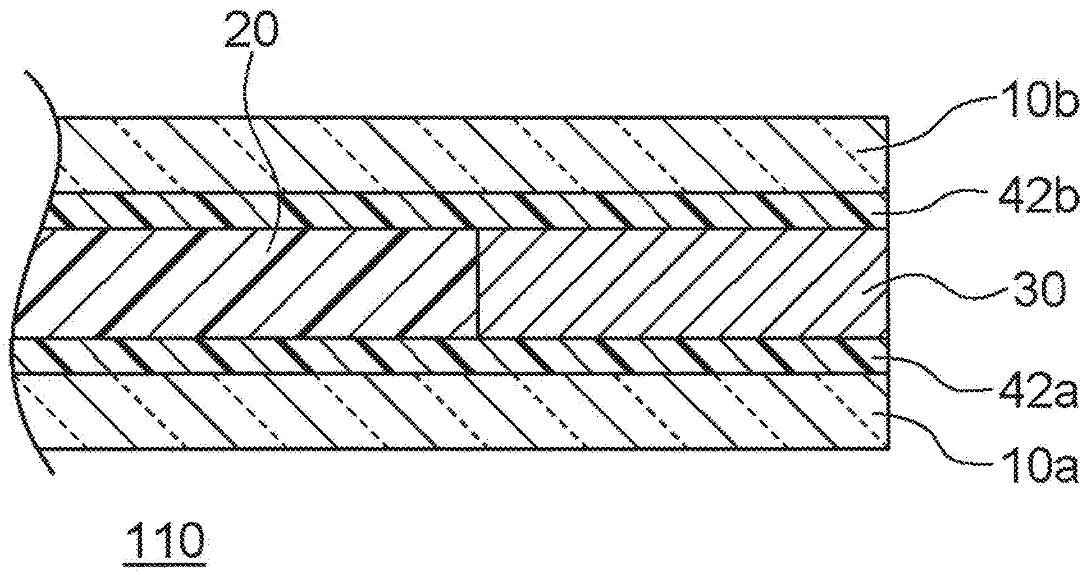
FIG. 2 is a schematic sectional view of a wavelength conversion member according to a second embodiment.

2. FIG. 2 is a schematic and partial sectional view of the wavelength conversion member 110. As illustrated in FIG. 2, the wavelength conversion member 110 is different from the wavelength conversion member 100 in that the first resin layer 42*a* includes a portion extending to a region between the first barrier layer 10*a* and the wavelength conversion layer 20, and the second resin layer 42*b* includes a portion extending to a region between the second barrier layer 10*b* and the wavelength conversion layer 20. In FIG. 2, both the first resin layer 42*a* and the second resin layer 42*b* includes a portion extending on the wavelength conversion layer 20. In another example, either the first resin layer 42*a* or the second resin layer 42*b* may include a portion extending on the wavelength conversion layer 20. The portions of the first resin layer 42*a* and the second resin layer 42*b* extending on the wavelength conversion layer 20 may cover the entirety of the main surface of the wavelength conversion layer 20 or may cover a part of the main surface.

When the first resin layer 42*a* or the second resin layer 42*b* has a portion continuous from the inorganic member 30 and extending on the wavelength conversion layer 20, the overall thickness of the wavelength conversion member 110 can be less likely to vary.

For example, in the wavelength conversion member 100 according to the first embodiment, in consideration of the thicknesses of both the wavelength conversion layer 20 and the inorganic member 30, it is desirable to arrange the first resin layer 40*a* and the second resin layer 40*b* with an appropriate application amount, pressing force, etc., to adjust their thicknesses. On the other hand, in the wavelength conversion member 110 according to the second embodiment, the thicknesses of the wavelength conversion layer 20 and the inorganic member 30 are set to be substantially equal and the film-like first resin layer 42*a* or second resin layer 42*b* are continuously arranged on the wavelength conversion layer 20 and the inorganic member 30, which can facilitate reduction in variation in the thickness in the production of the wavelength conversion member described above. The term “substantially equal” includes an error of ±10%.

Third Embodiment

Figure 3:
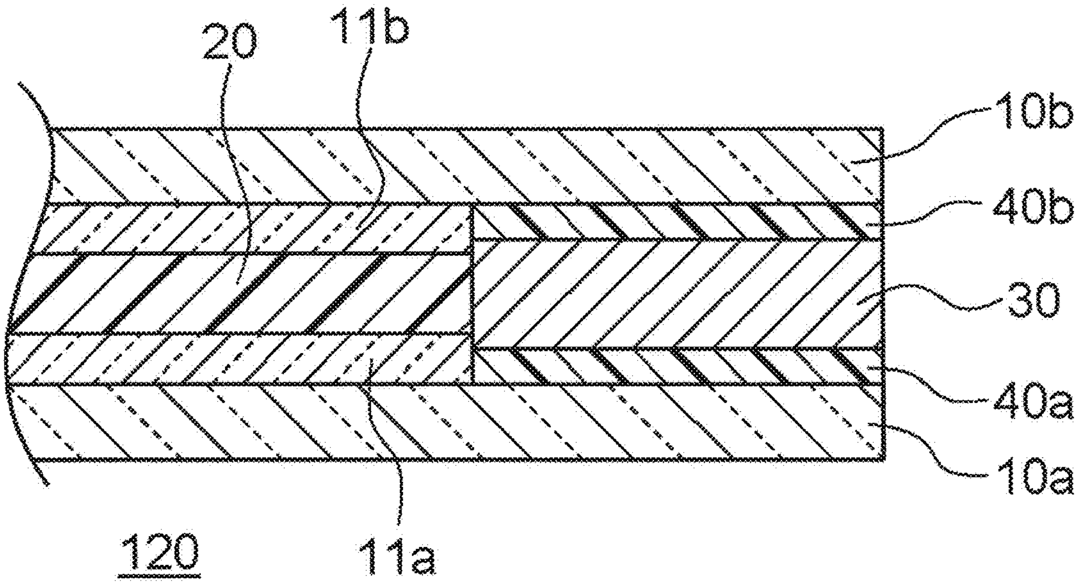
FIG. 3 is a schematic sectional view of a wavelength conversion member according to a third embodiment.

A wavelength conversion member 120 according to a third embodiment will be described with reference to FIG. 3. FIG. 3 is a schematic and partial sectional view of the wavelength conversion member 120. As illustrated in FIG. 3, the wavelength conversion member 120 according to the third embodiment is different from the wavelength conversion member 100 in further including a third barrier layer 11*a* disposed between the first barrier layer 10*a* and the wavelength conversion layer 20, and a fourth barrier layer 11*b* disposed between the second barrier layer 10*b* and the wavelength conversion layer 20. In FIG. 3, the wavelength conversion member 120 includes both the third barrier layer 11*a* and the fourth barrier layer 11*b*, but may alternatively include either of them. Including the third barrier layer 11*a* and the fourth barrier layer 11*b* allows, for example, at the time of manufacturing the wavelength conversion member 120, the wavelength conversion layer 20 to be protected from the external environment, which allows for further reducing degradation in light emission efficiency of the wavelength conversion member. In particular, when the wavelength conversion layer 20 contains quantum dots (for example, a chalcopyrite-based quantum dot) or phosphors that are easily deteriorated by moisture, oxygen, or the like, it is possible to reduce deterioration of the wavelength conversion layer 20 due to exposure to an external environment while the wavelength conversion layer 20 is manufactured and disposed on the first barrier layer 10*a* or the second barrier layer 10*b*.

As illustrated in FIG. 3, lateral surfaces of the third barrier layer 11*a* may cover the interface between the first resin layer 40*a* and the inorganic member 30. The lateral surfaces of the fourth barrier layer 11*b* may cover the interface between the second resin layer 40*b* and the inorganic member 30. With the interface between the first resin layer 40*a* and the inorganic member 30 covered with the lateral surfaces of the third barrier layer 11*a*, moisture, oxygen, and the like entering from a region between the first barrier layer 10*a* and the inorganic member 30 can be inhibited from reaching the wavelength conversion layer 20, which can further reduce degradation in light emission efficiency of the quantum dots contained in the wavelength conversion layer 20. With the interface between the second resin layer 40*b* and the inorganic member 30 covered with the lateral surfaces of the fourth barrier layer 11*b*, moisture, oxygen, and the like entering from a region between the second barrier layer 10*b* and the inorganic member 30 can be inhibited from reaching the wavelength conversion layer 20, which can further reduce degradation in light emission efficiency of the quantum dots contained in the wavelength conversion layer 20.

As the third barrier layer 11*a* and the fourth barrier layer 11*b*, the same materials as those of the first barrier layer 10*a* and the second barrier layer 10*b* can be employed. The average thickness of the substrate films of the third barrier layer 11*a* and fourth barrier layer 11*b* may be, for example, in a range from 20 μm to 150 μm, and preferably in a range from 25 μm to 100 μm. The inorganic layers of the third barrier layer and the fourth barrier layer may be thinner than the inorganic layer of the first barrier layer or the second barrier layer.

Fourth Embodiment

Figure 4:
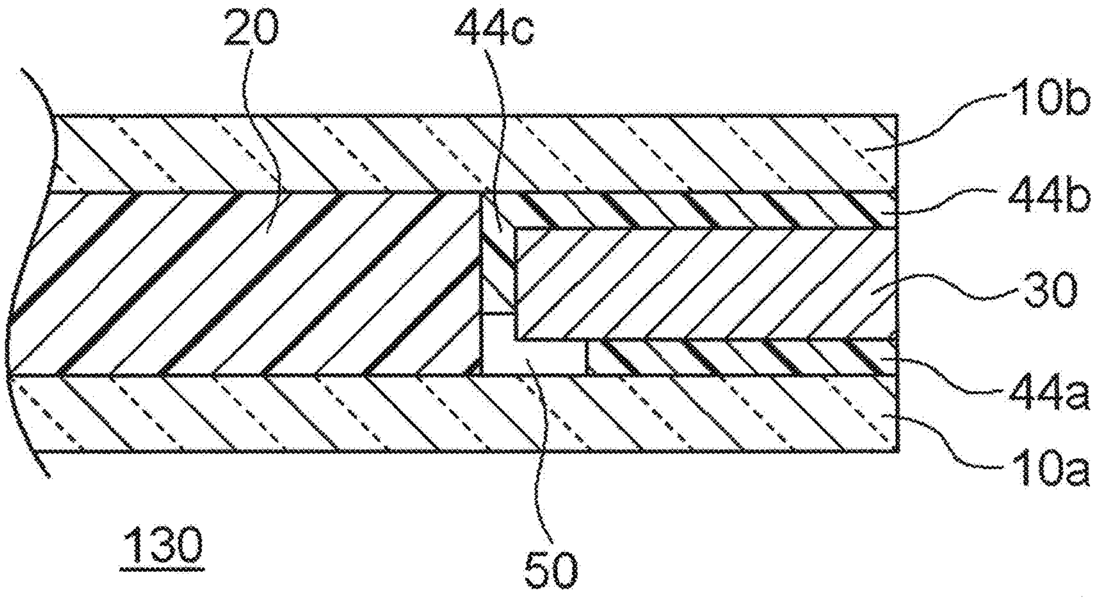
FIG. 4 is a schematic sectional view of a wavelength conversion member according to a fourth embodiment.

A wavelength conversion member 130 according to a fourth embodiment will be described with reference to FIG. 4. FIG. 4 is a schematic and partial sectional view of the wavelength conversion member 130. As illustrated in FIG. 4, the wavelength conversion member 130 according to the fourth embodiment is different from the wavelength conversion member 100 according to the first embodiment in the following configurations. That is, in the wavelength conversion member 130, the inorganic member 30 and the wavelength conversion layer 20 are apart from each other, and the second resin layer 44*b* includes a second resin layer extending portion 44*c* located between the inorganic member 30 and the wavelength conversion layer 20. The wavelength conversion member 130 includes a gap 50 surrounded by the first resin layer, the second resin layer, the first barrier layer 10*a*, the inorganic member 30, and the wavelength conversion layer 20. With the inorganic member 30 and the wavelength conversion layer 20 arranged apart from each other, the inorganic member 30 and the wavelength conversion layer 20 can be inhibited from coming into contact when the wavelength conversion layer 20 is arranged. In addition, providing the gap 50 can facilitate securing the margin of positional accuracy when the wavelength conversion layer 20 is arranged and the margin of processing when the inorganic member 30 is formed. As a result, the yield in the manufacture of the wavelength conversion member can improve.

In FIG. 4, the second resin layer 44*b* includes the second resin layer extending portion 44*c* formed between the wavelength conversion layer 20 and the inorganic member 30, but the first resin layer 44*a* may include the first resin layer extending portion located between the inorganic member 30 and the wavelength conversion layer 20. That is, at least one of the first resin layer 44*a* or the second resin layer 44*b* may further include a portion extending to at least a part of a region between a lateral surface of the wavelength conversion layer 20 and the inorganic member 30. For example, when the wavelength conversion member 130 includes a plurality of wavelength conversion layers, it is preferable that a resin layer located closer to a wavelength conversion layer containing quantum dots that are easily deteriorated extends to a region between a lateral surface of the wavelength conversion layer and the inorganic member. For example, when the wavelength conversion member includes a plurality of wavelength conversion layers 20, among which a wavelength conversion layer containing quantum dots (for example, a chalcopyrite-based quantum dot) that are easily deteriorated is disposed on the second barrier layer 10*b* side, the second resin layer 44*b* preferably includes the second resin layer extending portion 44*c*. The second resin layer extending portion 44*c* preferably covers at least a part of a lateral surface of the wavelength conversion layer (for example, a layer containing a chalcopyrite-based quantum dot) on the second barrier layer side, and more preferably covers the entire lateral surface.

In FIG. 4, the gap 50 surrounded by the first resin layer, the second resin layer, the first barrier layer 10*a*, the inorganic member 30, and the wavelength conversion layer 20 is formed, but a gap surrounded by the first resin layer, the second resin layer, the second barrier layer 10*b*, the inorganic member 30, and the wavelength conversion layer 20 may alternatively be formed. The gap may be surrounded by the first resin layer, the second resin layer, the first barrier layer 10*a* or the second barrier layer 10*b*, and the inorganic member 30, or may be surrounded by the first resin layer, the second resin layer, the inorganic member 30, and the wavelength conversion layer 20. That is, a gap may be formed to be surrounded by the first resin layer, the second resin layer, and at least two selected from the group consisting of the first barrier layer 10*a*, the second barrier layer 10*b*, the wavelength conversion layer 20, and the inorganic member 30.

In FIG. 4, the first resin layer 44*a* and the second resin layer 44*b* extend to an end surface of the wavelength conversion member 130, and an outer lateral surface of the first resin layer 44*a* and an outer lateral surface the second resin layer 44*b* form the end surface of the wavelength conversion member 130. Alternatively, the outer lateral surface of at least one of the first resin layer 44*a* or the second resin layer 44*b* may be positioned inward of an end surface of the wavelength conversion member 130.

Fifth Embodiment

Figure 5:
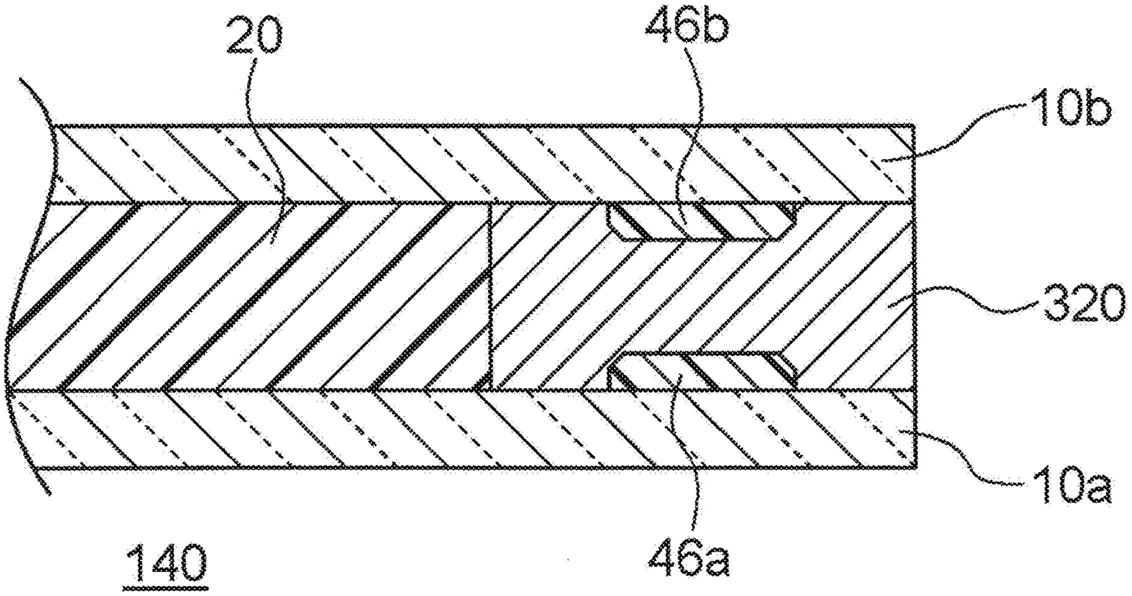
FIG. 5 is a schematic sectional view of a wavelength conversion member according to a fifth embodiment.

A wavelength conversion member 140 according to a fifth embodiment will be described with reference to FIG. 5. FIG. 5 is a schematic and partial sectional view of the wavelength conversion member 140. As illustrated in FIG. 5, the wavelength conversion member 140 according to the fifth embodiment is different from the wavelength conversion member 100 according to the first embodiment in that the wavelength conversion member has a recess in which the first resin layer 46*a* is disposed, the recess arranged at the seventh main surface of the inorganic member 320 facing the first barrier layer 10*a*, and has another recess in which the second resin layer 46*b* is disposed, the another recess arranged at the eighth main surface of the inorganic member 320 facing the second barrier layer 10*b*. A recess is arranged at the seventh main surface and/or the eighth main surface of the inorganic member 320, and at least a part of the first resin layer or the second resin layer is disposed in the recess, so that adhesion between the first barrier layer or the second barrier layer and the inorganic member 320 is further improved. Accordingly, moisture, oxygen, and the like entering from a region between the first barrier layer and the inorganic member 320 and from a region between the second barrier layer and the inorganic member 320 can be inhibited from reaching the wavelength conversion layer 20, which allows for reducing degradation in light emission efficiency of the quantum dots contained in the wavelength conversion layer 20.

In FIG. 5, the recess is arranged on each of the seventh main surface and the eighth main surface, but the recess may be arranged on at least one of the seventh main surface or the eighth main surface. In FIG. 5, one recess is arranged at each of the seventh main surface and the eighth main surface, but a plurality of recesses may be arranged at each of the seventh main surface and the eighth main surface. Further, in FIG. 5, each of the first resin layer 46*a* and the second resin layer 46*b* is disposed in the recess, but at least one of the first resin layer 46*a* or the second resin layer 46*b* may extend from the recess to the seventh main surface or the eighth main surface.

Sixth Embodiment

Figure 6:
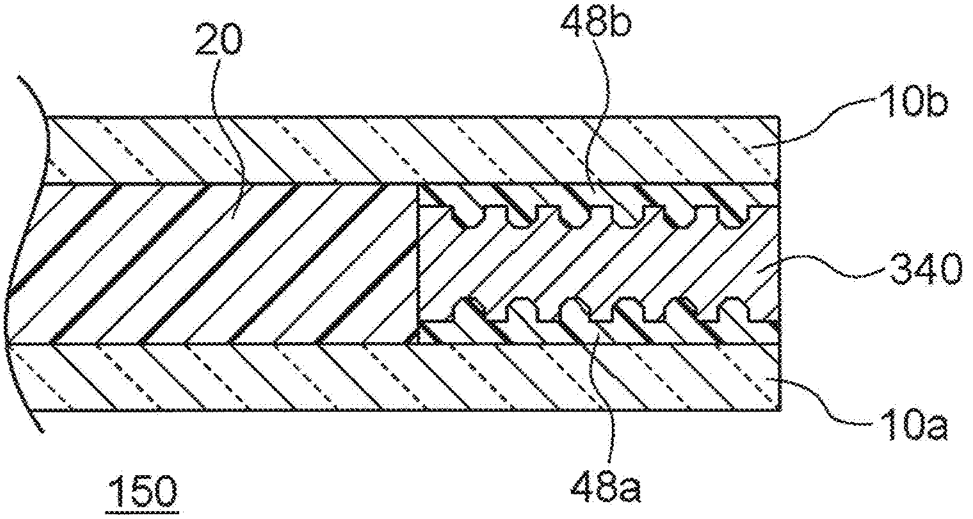
FIG. 6 is a schematic sectional view of a wavelength conversion member according to a sixth embodiment.

A wavelength conversion member 150 according to a sixth embodiment will be described with reference to FIG. 6. FIG. 6 is a schematic and partial sectional view of the wavelength conversion member 150. As illustrated in FIG. 6, the wavelength conversion member 150 according to the sixth embodiment is different from the wavelength conversion member 100 according to the first embodiment in that the wavelength conversion member 150 has a plurality of recesses in which the first resin layer 48*a*, covering the seventh main surface, is disposed, the plurality of recesses being arranged at the seventh main surface of the inorganic member 340 facing the first barrier layer 10*a*, and has another plurality of recesses in which the second resin layer 48*b*, covering the eighth main surface, is disposed, the another plurality of recesses arranged at the eighth main surface of the inorganic member 340 facing the second barrier layer 10*b*. A recess is arranged at the seventh main surface and/or the eighth main surface of the inorganic member, and at least a part of the first resin layer and/or the second resin layer is disposed in the recess, so that adhesion between the first barrier layer or the second barrier layer and the inorganic member is further improved. With this structure, moisture, oxygen, and the like entering from a region between the first barrier layer and the inorganic member 340 and from a region between the second barrier layer and the inorganic member 340 can be inhibited from reaching the wavelength conversion layer 20, which allows for reducing degradation in light emission efficiency of the quantum dots contained in the wavelength conversion layer 20. Further, with the plurality of recesses arranged at the seventh main surface or the eighth main surface, light reaching the end portion of the wavelength conversion member can be scattered by the recesses, and the intensity of light leakage at the end portion of the wavelength conversion member can be reduced.

Method for Manufacturing Wavelength Conversion Member

The method for manufacturing the wavelength conversion member may include, for example, a first step of disposing a frame including an inorganic member on a temporary support, a second step of forming a resin layer on the frame disposed on the temporary support, a third step of disposing a barrier layer on the formed resin layer, a fourth step of removing the temporary support, a fifth step of disposing the wavelength conversion layer at a location inward of the inorganic member, a sixth step of forming the resin layer on the frame, a seventh step of disposing the barrier layer on the formed resin layer, and an eighth step of cutting the inorganic member of the frame to obtain the wavelength conversion member. Hereinafter, a method for manufacturing the wavelength conversion member will be described with reference to FIGS. 7A to 7H.

First Step

Figure 7A:
FIG. 7A is a schematic sectional view illustrating one step of a method for manufacturing the wavelength conversion member according to the first embodiment.
Figure 8:
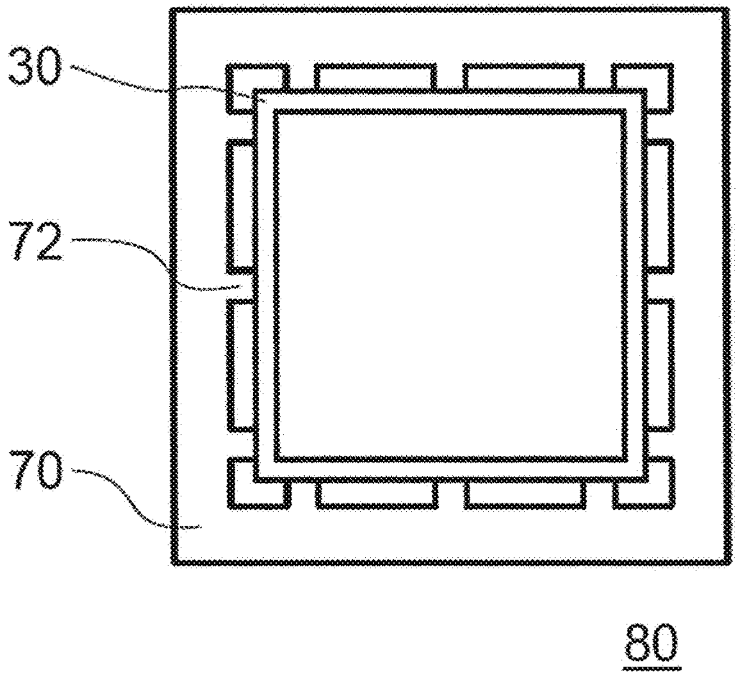
FIG. 8 is a schematic top view illustrating one step of a method for manufacturing a wavelength conversion member.

As illustrated in FIG. 7A, in the first step, a frame 80 including an inorganic member is disposed on a temporary support 60. The temporary support may be any appropriate member that has adhesion and can hold the frame. As the temporary support 60, for example, a UV sheet can be used. The UV sheet is, for example, a sheet in which an adhesive layer, configured such that its adhesive strength is reduced by UV irradiation, is disposed on one surface of a base material sheet of acrylic, urethane, or the like. As illustrated in FIG. 8, the frame 80 includes an inorganic member 30, a frame portion 70 surrounding the inorganic member 30, and a connecting portion 72 connecting the frame portion 70 and the inorganic member 30. In the frame 80, the inorganic member 30 is held by the frame portion 70 via the connecting portion 72, which allows for reducing warpage, shape change, and the like of the inorganic member when the wavelength conversion member 100 is manufactured.

Figure 9:
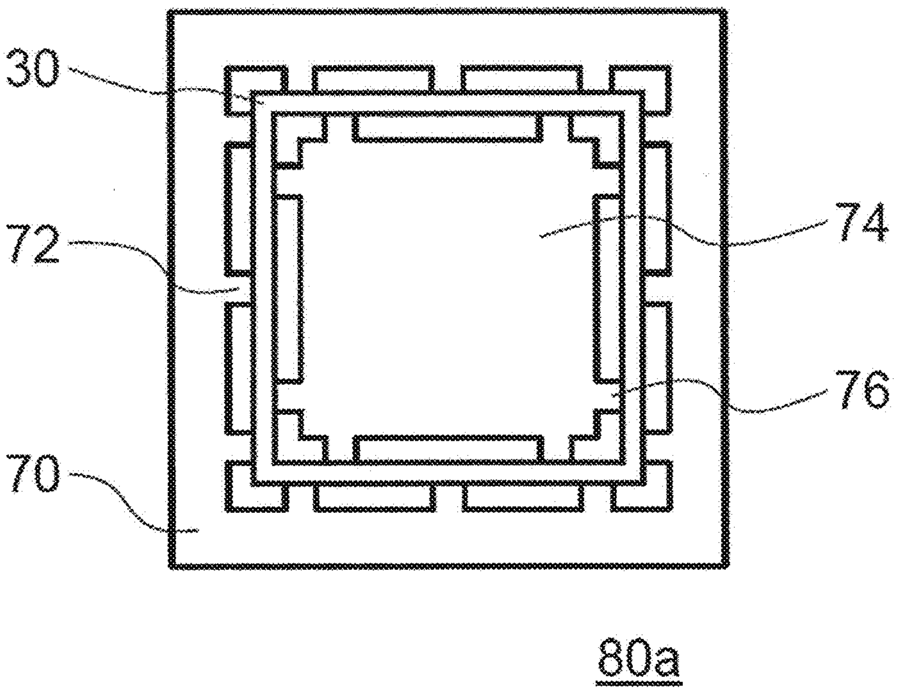
FIG. 9 is a schematic top view illustrating one step of the method for manufacturing the wavelength conversion member.

As illustrated in FIG. 9, the frame 80 may be formed by removing an auxiliary plate 74 from a frame structure 80*a* in which the auxiliary plate 74 is provided inside the inorganic member 30. The frame structure 80*a* includes an inorganic member 30, the frame portion 70 that holds the inorganic member 30 from the outside via the connecting portion 72, and the auxiliary plate 74 that holds the inorganic member 30 from the inside via the connecting portion 76. With the inorganic member 30 held from both the outer side and the inner side, warpage, shape change, and the like of the inorganic member during transportation and the like are further reduced. Removal of the auxiliary plate 74 from the frame structure 80*a* can be performed by cutting a portion at which the inorganic member 30 and the connecting portion 76 are connected together. The portion can be cut by, for example, a cutter or the like.

When the frame 80 is formed of the frame structure 80*a*, a cut portion, formed by cutting the portion at which the inorganic member 30 and the connecting portion 76 has been connected, is formed on an inner end surface of the inorganic member 30 facing the wavelength conversion layer. The cutting portion may have a cutting protrusion including a part of the connecting portion 76. With the cutting protrusion provided at the cut portion of the inner end surface, the wavelength conversion layer is less likely to move in an inner region in the subsequent step of disposing the wavelength conversion layer inside the inorganic member (fifth step), so that the disposition accuracy of the wavelength conversion layer improves. In addition, adhesion between the wavelength conversion layer and the inorganic member improves.

Second Step

Figure 7B:
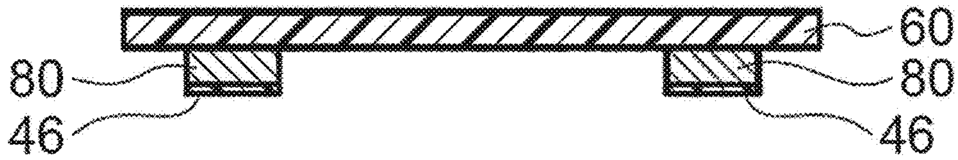
FIG. 7B is a schematic sectional view illustrating one step of the method for manufacturing the wavelength conversion member according to the first embodiment.

As illustrated in FIG. 7B, in the second step, the resin layer 46 is formed on the frame 80 disposed on the temporary support 60. The resin layer 46 is formed on at least the inorganic member 30, and may also be formed on the connecting portion 72 and the frame portion 70. The resin layer 46 is formed, for example, by applying a resin composition containing a resin and a solvent and removing at least a part of the solvent.

Third Step

Figure 7C:
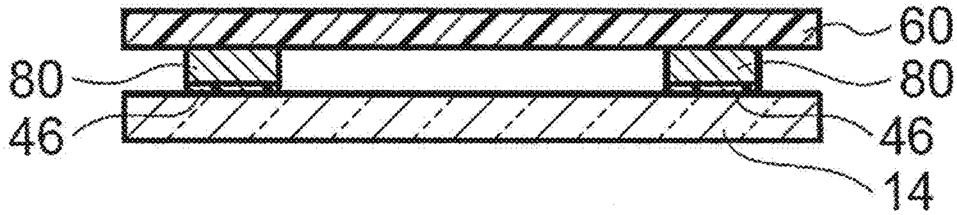
FIG. 7C is a schematic sectional view illustrating one step of the method for manufacturing the wavelength conversion member according to the first embodiment.

As illustrated in FIG. 7C, in the third step, the barrier film 14 is disposed on the resin layer 46 formed on the frame 80. The barrier film 14 includes, for example, a substrate film and an inorganic layer. The barrier film 14 is disposed, for example, by bonding the barrier film 14 onto the resin layer 46 by vacuum bonding. When the barrier film 14 includes an inorganic layer, the barrier film 14 is attached such that the inorganic layer faces the resin layer 46. Further, when the resin layer 46 is of an ultraviolet curing type, after the barrier film 14 is attached, the resin layer 46 may be cured by irradiating the resin layer 46 with ultraviolet rays through the barrier film 14. In the third step, the frame 80 including the inorganic member is disposed on the barrier film 14 via the resin layer 46, and the intermediate member in which the temporary support 60 is laminated on the frame 80 is produced.

Fourth Step

Figure 7D:
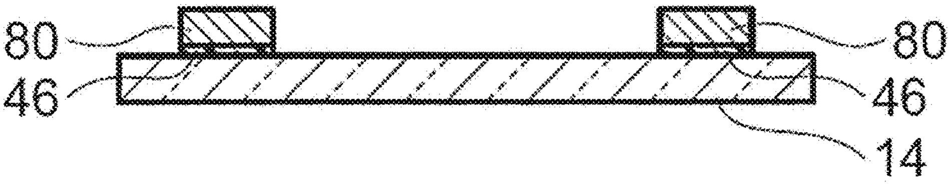
FIG. 7D is a schematic sectional view illustrating one step of the method for manufacturing the wavelength conversion member according to the first embodiment.

As illustrated in FIG. 7D, in the fourth step, the temporary support 60 is removed. The temporary support 60 can be removed by lowering the adhesion of the temporary support by, for example, ultraviolet irradiation or the like. Through the fourth step, an intermediate member in which the frame 80 including an inorganic member is disposed on the barrier film 14 via the resin layer 46 is produced.

Fifth Step

Figure 7E:
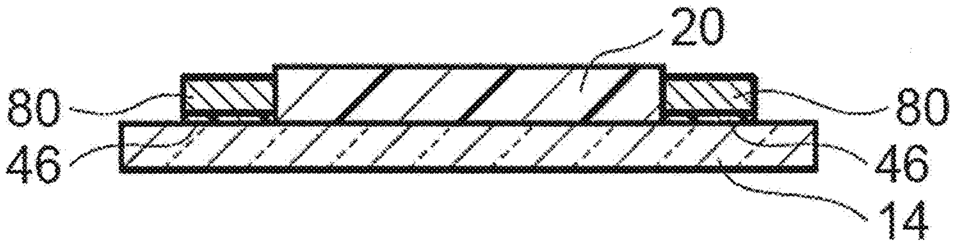
FIG. 7E is a schematic sectional view illustrating one step of the method for manufacturing the wavelength conversion member according to the first embodiment.

As illustrated in FIG. 7E, in the fifth step, the wavelength conversion layer 20 is disposed inside the inorganic member of the frame 80. The wavelength conversion layer 20 contains quantum dots and a resin cured product, and is formed in accordance with the shape of the inner side of the frame 80. By forming the wavelength conversion layer in advance, the thickness can be easily controlled, so that a wavelength conversion layer having a uniform thickness can be formed. The thickness of the wavelength conversion layer 20 disposed inward of the frame 80 is larger than the total thickness of the resin layer 46 and the frame 80.

Sixth Step

Figure 7F:
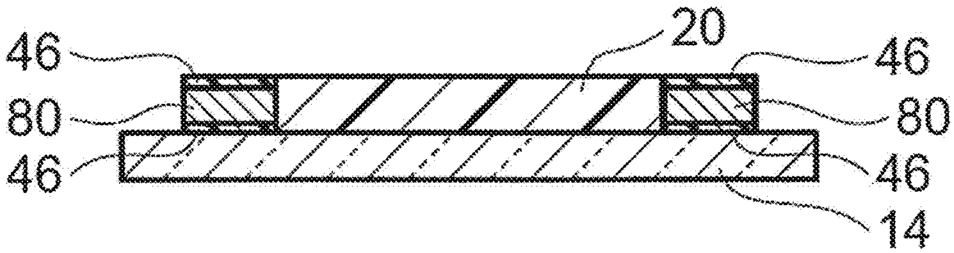
FIG. 7F is a schematic sectional view illustrating one step of the method for manufacturing the wavelength conversion member according to the first embodiment.

As illustrated in FIG. 7F, in the sixth step, an additional resin layer 46 is formed on the frame 80 on which the wavelength conversion layer 20 is disposed. The additional resin layer 46 is formed on at least the inorganic member 30, and may also be formed on the connecting portion 72 and the frame portion 70. The additional resin layer 46 is formed, for example, by applying a resin composition containing a resin and a solvent and removing at least a part of the solvent.

Seventh Step

Figure 7G:
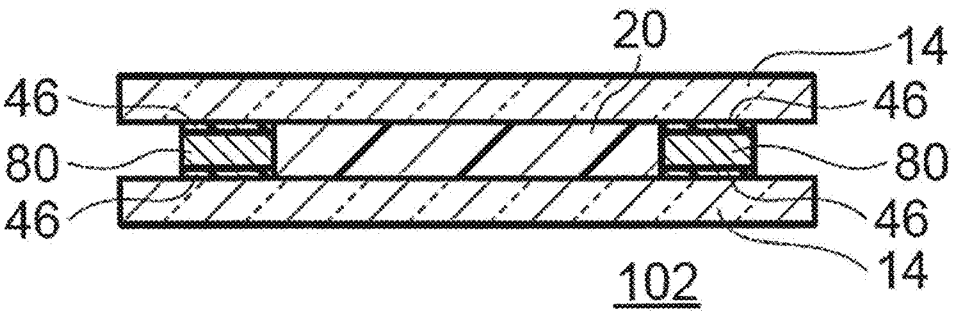
FIG. 7G is a schematic sectional view illustrating one step of the method for manufacturing the wavelength conversion member according to the first embodiment.

As illustrated in FIG. 7G, in the seventh step, an additional barrier film 14 is disposed on the additional resin layer 46 formed on the frame 80. The additional barrier film 14 is disposed, for example, by bonding the additional barrier film 14 onto the additional resin layer 46 by vacuum bonding. When the additional barrier film 14 includes an inorganic layer, the additional barrier film 14 is attached such that the inorganic layer faces the additional resin layer 46. Further, when the additional resin layer 46 is of an ultraviolet curing type, after the additional barrier film 14 is attached, the additional resin layer 46 may be cured by irradiating the additional resin layer 46 with ultraviolet rays through the additional barrier film 14. Through the seventh step, the wavelength conversion member structure 102 in which the frame 80 including an inorganic member is laminated on the barrier film 14 with the resin layer 46 disposed therebetween, the additional barrier film 14 is laminated on the frame 80 with the additional resin layer 46 disposed therebetween, and the wavelength conversion layer 20 is disposed inward of the frame can be obtained.

Eighth Step

Figure 7H:
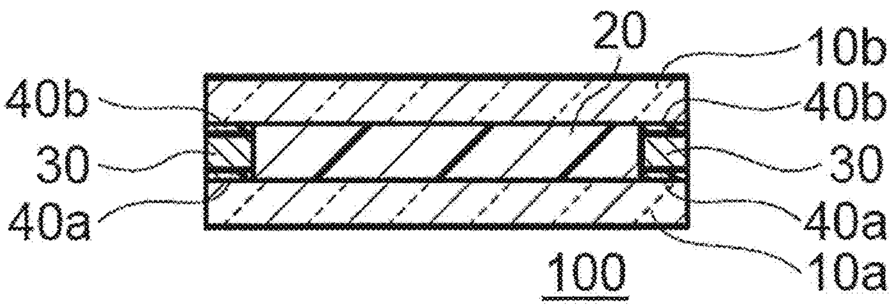
FIG. 7H is a schematic sectional view illustrating one step of the method for manufacturing the wavelength conversion member according to the first embodiment.

As illustrated in FIG. 7H, in the eighth step, in the wavelength conversion member structure 102, the wavelength conversion member structure 102 is cut so that the inorganic member 30 is cut out from the frame 80 to produce the wavelength conversion member 100. The wavelength conversion member structure 102 is cut by cutting a portion at which the inorganic member 30 and the connecting portion 72, connecting the inorganic member 30 and the frame portion 70, has been connected. The cutting is performed by using, for example, a cutter or the like. In the wavelength conversion member 100 obtained in the eighth step, a cut portion is formed on an outer end surface of the inorganic member by cutting the portion.

What is claimed is:

1. A wavelength conversion member comprising:

a wavelength conversion layer having a first main surface, a second main surface on a side opposite the first main surface, and lateral surfaces connecting the first main surface and the second main surface, the wavelength conversion layer containing quantum dots;

a first barrier layer disposed on the first main surface;

a second barrier layer disposed on the second main surface;

an inorganic member disposed between the first barrier layer and the second barrier layer and surrounding the lateral surfaces of the wavelength conversion layer in a plan view;

a first resin layer disposed between the first barrier layer and the inorganic member such that a lower surface of the first resin layer contacts an upper surface of the first barrier layer, and an upper surface of the first resin layer contacts a lower surface of the inorganic member; and a second resin layer disposed between the second barrier layer and the inorganic member such that an upper surface of the second resin layer contacts a lower surface of the second barrier layer, and a lower surface of the second resin layer contacts an upper surface of the inorganic member.

2. The wavelength conversion member according to claim 1, wherein the inorganic member contains metal.

3. The wavelength conversion member according to claim 1, wherein the inorganic member has a gas permeability of 1 $cc \cdot m^{-2} \cdot 24\ h^{-1} \cdot atm^{-1}$ or less.

4. The wavelength conversion member according to claim 1, wherein the first resin layer further includes a portion extending to at least a part of a region between the first barrier layer and the wavelength conversion layer.

5. The wavelength conversion member according to claim 1, wherein the second resin layer further includes a portion extending to at least a part of a region between the second barrier layer and the wavelength conversion layer.

6. The wavelength conversion member according to claim 1, wherein:

the wavelength conversion layer comprises:

a third barrier layer disposed between the first barrier layer and the wavelength conversion layer, and a fourth barrier layer disposed between the second barrier layer and the wavelength conversion layer.

7. The wavelength conversion member according to claim 6, wherein lateral surfaces of the third barrier layer cover an interface between the first resin layer and the inorganic member.

8. The wavelength conversion member according to claim 6, wherein lateral surfaces of the fourth barrier layer cover an interface between the second resin layer and the inorganic member.

9. The wavelength conversion member according to claim 1, further comprising an empty gap defined by at least the first resin layer, the second resin layer, the wavelength conversion layer, and the inorganic member.

10. The wavelength conversion member according to claim 1, wherein at least one of the first resin layer or the second resin layer further includes a portion extending to at least a part of a region between at least one of the lateral surfaces of the wavelength conversion layer and the inorganic member.

11. The wavelength conversion member according to claim 1, wherein a ratio of a thickness of the inorganic member to a thickness of the wavelength conversion layer is in a range from 0.6 to 1 in a direction orthogonal to the first main surface of the wavelength conversion layer.

12. The wavelength conversion member according to claim 1, wherein in a section orthogonal to the first main surface of the wavelength conversion layer and at least one of the lateral surfaces of the wavelength conversion layer, a width of the inorganic member in a direction orthogonal to the at least one of the lateral surfaces of the wavelength conversion layer is in a range from 100 μm to 1 mm.

13. The wavelength conversion member according to claim 1, wherein:

the inorganic member includes a first recess arranged at a surface facing the first barrier layer and/or a second recess arranged at a surface facing the second barrier layer, and at least a part of the first resin layer is disposed in the first recess, and/or at least a part of the second resin layer is disposed in the second recess.

14. The wavelength conversion member according to claim 13, wherein the first resin layer is entirely disposed in the first recess, or the second resin layer is entirely disposed in the second recess.

15. The wavelength conversion member according to claim 13, wherein at least one of the first recess or the second recess is spaced from an inner end surface of the inorganic member.

16. The wavelength conversion member according to claim 1, wherein an inner end surface of the inorganic member has a cutting protrusion.

17. The wavelength conversion member according to claim 9, wherein the empty gap is further defined by the first barrier layer or the second barrier layer.

* * * * *